(12) United States Patent
Ishitani et al.

(10) Patent No.: US 7,804,560 B2
(45) Date of Patent: Sep. 28, 2010

(54) DISPLAY DEVICE

(75) Inventors: Tetsuji Ishitani, Kanagawa (JP); Yuji Egi, Kanagawa (JP); Takeshi Nishi, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 928 days.

(21) Appl. No.: 11/613,785

(22) Filed: Dec. 20, 2006

(65) Prior Publication Data

US 2007/0146580 A1 Jun. 28, 2007

(30) Foreign Application Priority Data

Dec. 28, 2005 (JP) ............................. 2005-380154

(51) Int. Cl.
*G02F 1/1335* (2006.01)
(52) U.S. Cl. ...................................................... 349/96
(58) Field of Classification Search ............ 349/96–97; 359/491–492, 494
See application file for complete search history.

(56) References Cited

U.S. PATENT DOCUMENTS

| | | | |
|---|---|---|---|
| 4,068,926 A * | 1/1978 | Nakamura et al. ............ 349/97 |
| 4,592,623 A | 6/1986 | Yamamoto et al. | |
| 4,769,242 A | 9/1988 | Shibanai | |
| 4,769,292 A | 9/1988 | Tang et al. | |
| 4,968,120 A | 11/1990 | Depp et al. | |
| 5,050,965 A | 9/1991 | Conner et al. | |
| 5,142,393 A | 8/1992 | Okumura et al. | |
| 5,237,438 A | 8/1993 | Miyashita et al. | |
| 5,283,132 A | 2/1994 | Ogura et al. | |
| 5,305,143 A | 4/1994 | Taga et al. | |
| 5,396,406 A | 3/1995 | Ketchpel | |
| 5,583,677 A | 12/1996 | Ito et al. | |
| 5,831,375 A | 11/1998 | Benson | |
| 5,856,819 A | 1/1999 | Vossler | |
| 6,011,580 A | 1/2000 | Hattori et al. | |
| 6,023,317 A | 2/2000 | Xu et al. | |

(Continued)

FOREIGN PATENT DOCUMENTS

EP 0 365 778 A2 5/1990

(Continued)

OTHER PUBLICATIONS

P. Lazarev et al.: "Thin Crystal Films (TCF) for LCD Contrast Enhancement," SID Digest '03 : SID International Symposium Digest of Technical Papers, pp. 669-671 (2003).

(Continued)

*Primary Examiner*—James A Dudek
(74) *Attorney, Agent, or Firm*—Fish & Richardson P.C.

(57) ABSTRACT

An object of the invention is to provide a display device having a high contrast ratio by a simple and easy method. Another object of the invention is to manufacture such a high-performance display device at low cost. In a display device having a display element between a pair of light-transmissive substrates, polarizing plates each having an extinction coefficient of an absorption axis which is different from that of an absorption axis of another polarizing plate are stacked to be provided. At that time, the stacked polarizing plates are arranged so as to be in a parallel nicol state. A wave plate and a retardation film may be provided between the stacked polarizing plates and the substrates.

24 Claims, 18 Drawing Sheets

U.S. PATENT DOCUMENTS

| | | |
|---|---|---|
| 6,097,147 A | 8/2000 | Baldo et al. |
| 6,147,734 A | 11/2000 | Kashima |
| 6,201,592 B1 | 3/2001 | Terashita et al. |
| 6,291,255 B1 | 9/2001 | Huang et al. |
| 6,356,029 B1 | 3/2002 | Hunter |
| 6,445,005 B1 | 9/2002 | Yamazaki et al. |
| 6,577,361 B1 | 6/2003 | Sekiguchi et al. |
| 6,583,770 B1 | 6/2003 | Antila et al. |
| 6,621,508 B1 | 9/2003 | Shiraishi et al. |
| 6,646,698 B2 | 11/2003 | Mori |
| 6,656,608 B1 | 12/2003 | Kita et al. |
| 6,657,260 B2 | 12/2003 | Yamazaki et al. |
| 6,689,492 B1 | 2/2004 | Yamazaki et al. |
| 6,706,339 B1 | 3/2004 | Miyatake et al. |
| 6,762,436 B1 | 7/2004 | Huang et al. |
| 6,765,721 B2 | 7/2004 | Kawazu et al. |
| 6,774,877 B2 | 8/2004 | Nishitoba et al. |
| 6,778,229 B2 | 8/2004 | Inoue et al. |
| 6,784,457 B2 | 8/2004 | Yamazaki et al. |
| 6,806,640 B2 | 10/2004 | Okada et al. |
| 6,816,217 B2 | 11/2004 | Sone |
| 6,830,828 B2 | 12/2004 | Thompson et al. |
| 6,863,997 B2 | 3/2005 | Thompson et al. |
| 6,869,695 B2 | 3/2005 | Thompson et al. |
| 6,872,472 B2 | 3/2005 | Liao et al. |
| 6,887,592 B2 | 5/2005 | Hieda et al. |
| 6,893,743 B2 | 5/2005 | Sato et al. |
| 6,894,312 B2 | 5/2005 | Yamazaki et al. |
| 6,897,916 B2 | 5/2005 | Hamamoto |
| 6,911,271 B1 | 6/2005 | Lamansky et al. |
| 6,934,081 B2 | 8/2005 | Higashio et al. |
| 6,939,624 B2 | 9/2005 | Lamansky et al. |
| 6,942,931 B2 | 9/2005 | Lee et al. |
| 6,951,694 B2 | 10/2005 | Thompson et al. |
| 6,970,144 B1 | 11/2005 | Swift et al. |
| 6,970,218 B2 | 11/2005 | Fukuda et al. |
| 6,985,291 B2 | 1/2006 | Watson et al. |
| 6,995,816 B2 | 2/2006 | Mi et al. |
| 6,998,772 B2 | 2/2006 | Terumoto |
| 7,015,990 B2 | 3/2006 | Yeh et al. |
| 7,034,451 B2 | 4/2006 | Senbonmatsu |
| 7,057,682 B2 | 6/2006 | Watson et al. |
| 7,059,718 B2 | 6/2006 | Masterson |
| 7,060,370 B2 | 6/2006 | Kinoshita et al. |
| 7,060,371 B2 | 6/2006 | Akiyama et al. |
| 7,064,740 B2 | 6/2006 | Daly |
| 7,126,659 B2 | 10/2006 | Fukuda et al. |
| 7,139,053 B2 | 11/2006 | Yuuki et al. |
| 7,144,608 B2 | 12/2006 | Paukshoto et al. |
| 7,148,502 B2 | 12/2006 | Yamazaki et al. |
| 7,157,156 B2 | 1/2007 | Raychaudhuri et al. |
| 7,161,185 B2 | 1/2007 | Yamazaki et al. |
| 7,161,649 B2 | 1/2007 | Lee et al. |
| 7,175,898 B2 | 2/2007 | Lühmann et al. |
| 7,176,619 B2 | 2/2007 | Miyachi et al. |
| 7,176,999 B2 | 2/2007 | Miyachi |
| 7,211,823 B2 | 5/2007 | Tung et al |
| 7,218,365 B2 | 5/2007 | Chang et al. |
| 7,265,383 B2 | 9/2007 | Yamazaki et al. |
| 7,301,591 B2 | 11/2007 | Akiyama |
| 7,307,679 B2 | 12/2007 | Toyooka et al. |
| 7,315,338 B2 | 1/2008 | Yeh et al. |
| 7,317,279 B2 | 1/2008 | Chen |
| 7,324,180 B2 | 1/2008 | Kashima |
| 7,327,335 B2 | 2/2008 | Yamazaki et al. |
| 7,333,077 B2 | 2/2008 | Koyama et al. |
| 7,339,316 B2 | 3/2008 | Adachi et al. |
| 7,375,464 B2 | 5/2008 | Chin et al. |
| 7,381,479 B2 | 6/2008 | Lamansky et al. |
| 7,453,640 B2 | 11/2008 | Yeh et al. |
| 7,468,769 B2 | 12/2008 | Nakagawa |
| 2001/0048405 A1 | 12/2001 | Salley |
| 2002/0025419 A1 | 2/2002 | Lee et al. |
| 2002/0027416 A1 | 3/2002 | Kim et al. |
| 2002/0093284 A1 | 7/2002 | Adachi et al. |
| 2002/0113546 A1 | 8/2002 | Seo et al. |
| 2002/0140343 A1 | 10/2002 | Hirabayashi |
| 2002/0159003 A1 | 10/2002 | Sato et al. |
| 2002/0186469 A1 | 12/2002 | Kawazu et al. |
| 2003/0017361 A1 | 1/2003 | Thompson et al. |
| 2003/0053011 A1 | 3/2003 | Mori |
| 2003/0054199 A1 | 3/2003 | Oh |
| 2003/0057419 A1 | 3/2003 | Murakami et al. |
| 2003/0063456 A1 | 4/2003 | Katahira |
| 2003/0103022 A1 | 6/2003 | Noguchi et al. |
| 2003/0129452 A1 | 7/2003 | Tsuji et al. |
| 2003/0147030 A1 | 8/2003 | Sone |
| 2003/0210360 A1 | 11/2003 | Yoshida |
| 2004/0105049 A1 | 6/2004 | Yeh et al. |
| 2004/0141122 A1 | 7/2004 | Nakagawa |
| 2004/0144974 A1 | 7/2004 | Lee et al. |
| 2004/0146663 A1 | 7/2004 | Paukshto et al. |
| 2004/0151829 A1 | 8/2004 | Boroson et al. |
| 2004/0169461 A1 | 9/2004 | Moriyama et al. |
| 2004/0169624 A1 | 9/2004 | Yamazaki et al. |
| 2004/0174478 A1 | 9/2004 | Fukuda et al. |
| 2004/0183082 A1 | 9/2004 | Yamazaki |
| 2004/0201341 A1 | 10/2004 | Miyachi et al. |
| 2004/0202893 A1 | 10/2004 | Abe |
| 2004/0227698 A1 | 11/2004 | Yamazaki et al. |
| 2004/0233362 A1 | 11/2004 | Kashima |
| 2004/0239658 A1 | 12/2004 | Koyama et al. |
| 2004/0245529 A1 | 12/2004 | Yamazaki et al. |
| 2004/0251823 A1 | 12/2004 | Park et al. |
| 2004/0257497 A1 | 12/2004 | Paukshto et al. |
| 2004/0262576 A1 | 12/2004 | Thompson et al. |
| 2004/0263056 A1 | 12/2004 | Seo et al. |
| 2004/0263066 A1 | 12/2004 | Abe et al. |
| 2004/0263069 A1 | 12/2004 | Yamazaki et al. |
| 2005/0012686 A1 | 1/2005 | Osame et al. |
| 2005/0024339 A1 | 2/2005 | Yamazaki et al. |
| 2005/0073627 A1 | 4/2005 | Akiyama |
| 2005/0077817 A1 | 4/2005 | Yamazaki et al. |
| 2005/0093438 A1 | 5/2005 | Chen |
| 2005/0100660 A1 | 5/2005 | Ito et al. |
| 2005/0123791 A1 | 6/2005 | Deaton et al. |
| 2005/0127820 A1 | 6/2005 | Yamazaki et al. |
| 2005/0140895 A1 | 6/2005 | Watson et al. |
| 2005/0157225 A1 | 7/2005 | Toyooka et al. |
| 2005/0157255 A1 | 7/2005 | Masterson |
| 2005/0162092 A1 | 7/2005 | Yamazaki et al. |
| 2005/0179835 A1 | 8/2005 | Lee et al. |
| 2005/0202278 A1 | 9/2005 | Mishima et al. |
| 2005/0253789 A1 | 11/2005 | Ikeda |
| 2006/0007376 A1 | 1/2006 | Fukuda et al. |
| 2006/0024526 A1 | 2/2006 | Thompson et al. |
| 2006/0055847 A1 | 3/2006 | Yamazaki et al. |
| 2006/0114375 A1 | 6/2006 | Yeh et al. |
| 2006/0114376 A1 | 6/2006 | Yeh et al. |
| 2006/0114384 A1 | 6/2006 | Yeh et al. |
| 2006/0158096 A1 | 7/2006 | Adachi et al. |
| 2006/0164571 A1 | 7/2006 | Broer et al. |
| 2006/0215096 A1 | 9/2006 | Iwamoto et al. |
| 2007/0014009 A1 | 1/2007 | Cross et al. |
| 2007/0054066 A1 | 3/2007 | Usukura et al. |
| 2007/0120475 A1 | 5/2007 | Ishitani et al. |
| 2007/0121033 A1 | 5/2007 | Ishitani et al. |
| 2007/0126962 A1 | 6/2007 | Egi et al. |
| 2007/0146579 A1 | 6/2007 | Egi et al. |
| 2007/0159044 A1 | 7/2007 | Ishitani et al. |
| 2007/0177071 A1 | 8/2007 | Egi et al. |
| 2007/0177084 A1 | 8/2007 | Ishitani et al. |
| 2007/0177086 A1 | 8/2007 | Ishitani et al. |
| 2007/0182885 A1 | 8/2007 | Egi et al. |

| | | | |
|---|---|---|---|
| 2007/0200977 A1 | 8/2007 | Egi et al. | |
| 2007/0200978 A1 | 8/2007 | Ishitani et al. | |
| 2007/0285777 A1 | 12/2007 | Toyoshima et al. | |
| 2009/0179549 A1 | 7/2009 | Abe et al. | |

FOREIGN PATENT DOCUMENTS

| | | |
|---|---|---|
| EP | 1152282 | 11/2001 |
| JP | 62-206524 | 9/1987 |
| JP | 64-082014 | 3/1989 |
| JP | 03-257429 | 11/1991 |
| JP | 05-034731 | 2/1993 |
| JP | 05-100114 | 4/1993 |
| JP | 06-222357 | 8/1994 |
| JP | 06-265728 | 9/1994 |
| JP | 07-142170 | 6/1995 |
| JP | 07-181476 | 7/1995 |
| JP | 2761453 | 6/1998 |
| JP | 10-255976 | 9/1998 |
| JP | 2000-180843 | 6/2000 |
| JP | 2000-249832 | 9/2000 |
| JP | 3174367 | 6/2001 |
| JP | 2001-242320 | 9/2001 |
| JP | 2002-277867 | 9/2002 |
| JP | 2003-172819 | 6/2003 |
| JP | 2003-279963 | 10/2003 |
| JP | 2004-354818 | 12/2004 |
| WO | WO 00/34821 | 6/2000 |
| WO | WO2004-036272 | 4/2004 |
| WO | 2005050269 A1 | 6/2005 |

OTHER PUBLICATIONS

Office Action; Chinese Patent Application No. 200610156270.7; dated Aug. 7, 2009 w/English translation.

European Search Report (Application No. 06025873.8), dated Jan. 29, 2007, 7 pages.

J. Chen et al.; "21.2: Optimum Film Compensation Modes for TN and VA LCDs"; *SID 98 Digest—SID International Symposium Digest of Technical Papers*; pp. 315-318; 1998.

* cited by examiner

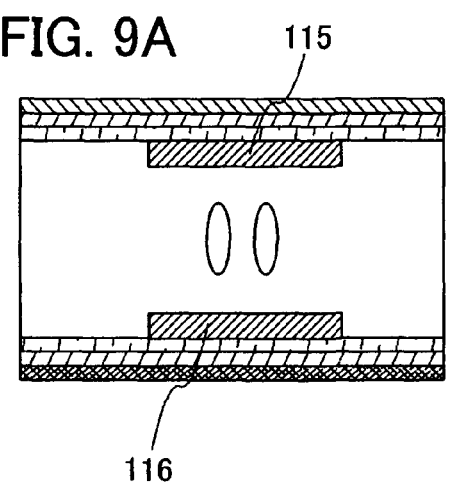
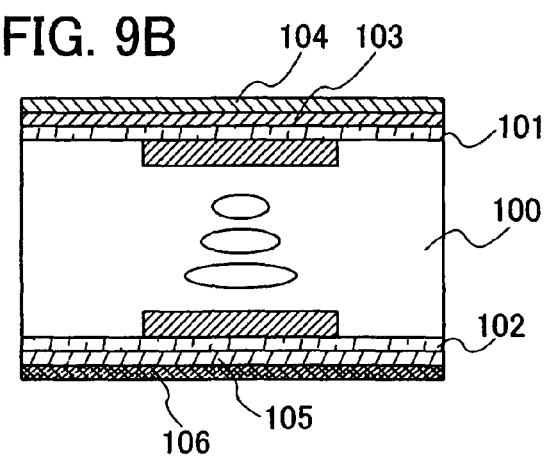
FIG. 9A
FIG. 9B

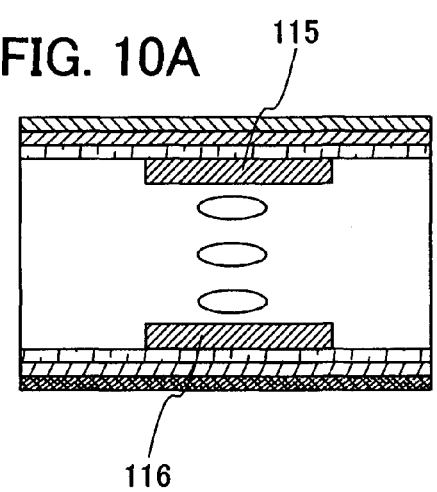
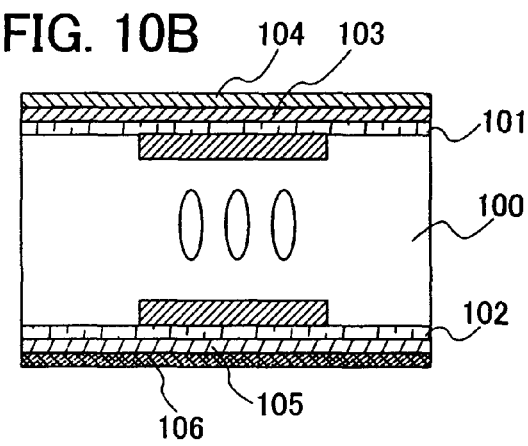
FIG. 10A
FIG. 10B

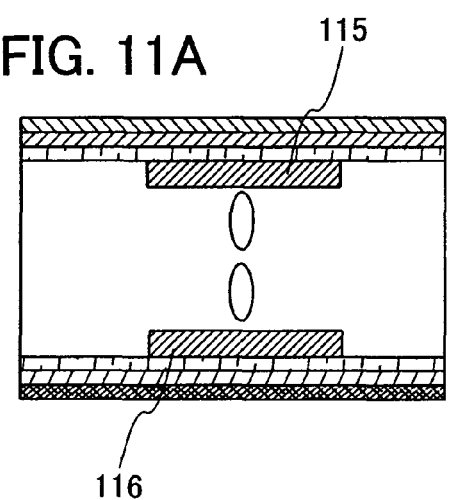
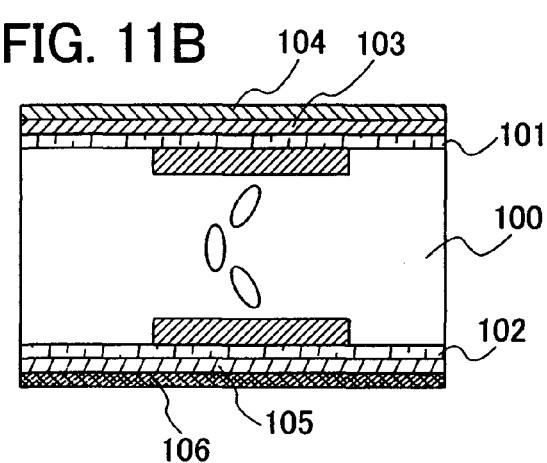

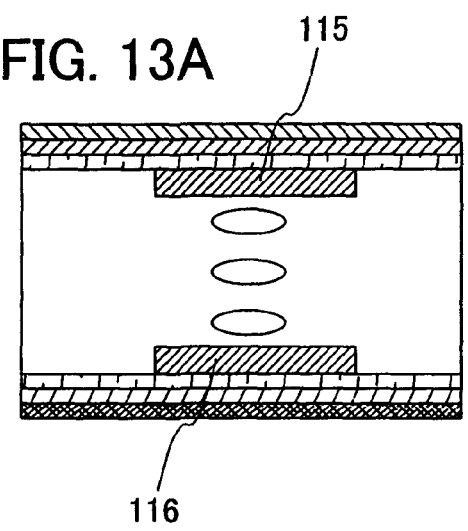
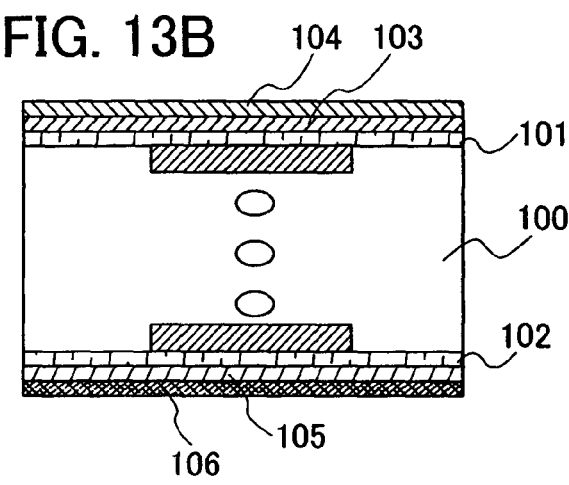
FIG. 13A  
FIG. 13B

DISPLAY DEVICE

BACKGROUND OF THE INVENTION

1. Field of the Invention

The present invention relates to a structure of a display device.

2. Description of the Related Art

A so-called flat panel display, which is a display device that is very thin and lightweight as compared to the conventional cathode-ray tube display device, has been developed. A liquid crystal display device having a liquid crystal element as a display element, a light emitting device having a self-light emitting element, an FED (field emission display) using an electron beam, and the like compete in the market of flat panel displays. Therefore, lower power consumption and a higher contrast ratio are demanded in order to increase the added value and to differentiate from other products.

In general, a liquid crystal display device is provided with one polarizing plate over each of substrates to keep a contrast ratio. The higher the contrast ratio is, the more clearly black display is performed. Therefore, higher display quality can be provided when an image is seen in a dark room such as a home theater room.

For example, it is suggested that a first polarizing plate is provided outside a substrate on a viewing side of a liquid crystal cell, a second polarizing plate is provided outside a substrate on a side opposite the viewing side, and a third polarizing plate is provided for heightening the polarization degree when light from an auxiliary light source provided on the substrate side polarizes through the second polarizing plate and passes the liquid crystal cell, in order to improve unevenness of display and a contrast ratio which are caused due to shortage of polarization degree and polarization distribution of polarizing plates (see Patent Document 1).

[Patent Document 1] PCT International Publication No. 00/34821

SUMMARY OF THE INVENTION

However, a contrast ratio still has been demanded to be enhanced and researches have been made for enhancement of a contrast ratio in liquid crystal display devices and the other display devices. Further, it is a problem that a polarizing plate having a high polarization degree is expensive.

A method for improving a contrast ratio by using three polarizing plates as described in Patent Document 1 can be realized by using an inexpensive polarizing plate; however, it is difficult to perform display with a higher contrast ratio by the method. Although stacking an additional polarizing plate improves a contrast ratio, it cannot suppress slight light leakage. This is because wavelength dependency of an absorption property is not constant, that is, an absorption property in a specific wave length region is lower than that in another wave length region. In other words, light is hardly absorbed only in the specific region. The same kind of polarizing plates are generally used; therefore, even if polarizing plates are stacked to improve contrast, a wavelength region in which light is not easily absorbed remains as it is. This causes the aforementioned slight light leakage. The light leakage prevents a contrast ratio from being enhanced.

In view of the aforementioned problems, an object of the invention is to provide a display device having a high contrast ratio by a simple and easy method. Another object of the invention is to manufacture a high-performance display device at low cost.

In the invention, stacked polarizing plates are provided over each of light-transmissive substrates arranged so as to face each other. Each of the stacked polarizing plates has a different extinction coefficient. A wave plate and a retardation film may be provided between the stacked polarizing plates and the substrates.

One mode of the invention is a display device including a display element sandwiched between a first light-transmissive substrate and a second light-transmissive substrate which are provided so as to face each other; and polarizing plates stacked outside the first light-transmissive substrate or the second light-transmissive substrate, in which each of the stacked polarizing plates has an extinction coefficient of an absorption axis which is different from that of an absorption axis of another polarizing plate, and absorption axes of the stacked polarizing plates are in a parallel nicol state.

Another mode of the invention is a display device including a display element sandwiched between a first light-transmissive substrate and a second light-transmissive substrate which are provided so as to face each other; a retardation film outside the first light-transmissive substrate or the second light-transmissive substrate; and stacked polarizing plates outside the retardation film, in which each of the stacked polarizing plates has an extinction coefficient of an absorption axis which is different from that of an absorption axis of another polarizing plate, and the absorption axes of the stacked polarizing plates are in a parallel nicol state.

Another mode of the invention is a display device including a display element sandwiched between a first light-transmissive substrate and a second light-transmissive substrate which are provided so as to face each other; first stacked polarizing plates outside the first light-transmissive substrate; and second stacked polarizing plates outside the second light-transmissive substrate, in which each of the first stacked polarizing plates has an extinction coefficient of an absorption axis which is different from that of an absorption axis of another polarizing plate, and absorption axes of the first stacked polarizing plates are in a parallel nicol state; and each of the second stacked polarizing plates has an extinction coefficient of an absorption axis which is different from that of an absorption axis of another polarizing plate, and absorption axes of the second stacked polarizing plates are in a parallel nicol state.

Another mode of the invention is a display device including a display element sandwiched between a first light-transmissive substrate and a second light-transmissive substrate which are provided so as to face each other; a first retardation film outside the first light-transmissive substrate; a second retardation film outside the second light-transmissive substrate; first stacked polarizing plates outside the first retardation film; and second stacked polarizing plates outside the second retardation film, in which each of the first stacked polarizing plates has an extinction coefficient of an absorption axis which is different from that of an absorption axis of another polarizing plate, and absorption axes of the first stacked polarizing plates are in a parallel nicol state; and each of the second stacked polarizing plates has an extinction coefficient of an absorption axis which is different from that of an absorption axis of another polarizing plate, and absorption axes of the second stacked polarizing plates are in a parallel nicol state.

A simple and easy structure in which a plurality of different polarizing plates are provided can improve a contrast ratio of a display device.

BRIEF DESCRIPTION OF DRAWINGS

FIGS. 9A and 9B are cross sectional views each showing a liquid crystal mode of the invention.

FIGS. 10A and 10B are cross sectional views each showing a liquid crystal mode of the invention.

FIGS. 11A and 11B are cross sectional views each showing a liquid crystal mode of the invention.

FIGS. 13A and 13B are cross sectional views each showing a liquid crystal mode of the invention.

DETAILED DESCRIPTION OF THE INVENTION

Figure 1A:
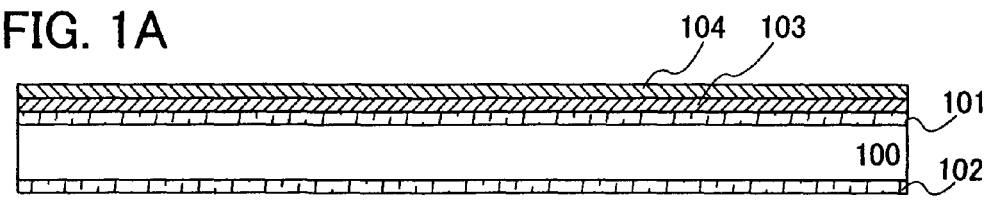
FIGS. 1A and 1B are a cross sectional view and a perspective view showing a liquid crystal dipslay device of the invention, respectively.

Although the invention will be fully described by way of embodiment modes and an embodiment with reference to the accompanying drawings, it is to be understood that various changes and modifications will be apparent to those skilled in the art. Therefore, unless such changes and modifications depart from the spirit and the scope of the invention, they should be construed as being included therein. Note that common portions and portions having a similar function are denoted by the same reference numerals in all diagrams for describing embodiment modes, and description thereof is omitted.

Embodiment Mode 1

In this embodiment, a concept of a display device of the invention is described.

Figure 1B:
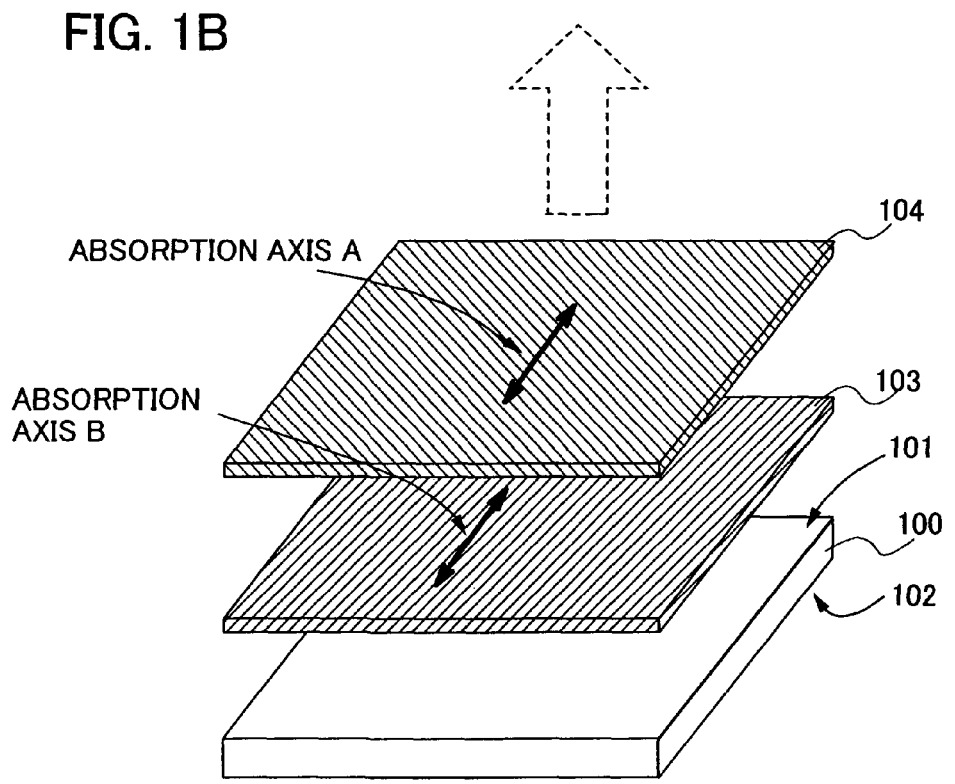

FIG. 1A shows a cross sectional view of a display device provided with stacked polarizing plates each having an extinction coefficient of an absorption axis which is different from that of an absorption axis of another polarizing plate, and FIG. 1B shows a perspective view of the display device.

As shown in FIG. 1A, a layer 100 having a display element is sandwiched between a first substrate 101 and a second substrate 102 which are arranged so as to face each other. Each of the substrates is a light-transmissive insulating substrate (hereinafter also referred to as a light-transmissive substrate). The substrates can be formed of, for example, a glass substrate such as barium borosilicate glass or aluminoborosilicate glass, a quartz substrate, or the like. Further, a substrate formed of plastic represented by polyethylene terephthalate (PET), polyethylene naphthalate (PEN), and polyether sulfone (PES), or a synthetic resin having flexibility such as acrylic can be applied to the substrates. Note that the first substrate 101 and the second substrate 102 are light-transmissive substrates which transmit visible light.

Stacked polarizing plates each having an extinction coefficient of an absorption axis which is different from that of an absorption axis of another polarizing plate are provided outside the substrates, that is, on sides which are not in contact with the layer having a display element. A first polarizing plate 103 and a second polarizing plate 104 are provided outside of the first substrate 101 side. An extinction coefficient of absorption axis B of the first polarizing plate 103 and that of absorption axis A of the second polarizing plate 104 are different.

The polarizing plates can be formed of a known material. For example, a structure where an adhesive layer, TAC (triacetylcellulose), a mixed layer of PVA (polyvinyl alcohol) and iodine, and TAC are sequentially stacked from the substrate side can be used. Polarization degree can be controlled by the mixed layer of PVA (polyvinyl alcohol) and iodine. Alternatively, a polarizing plate using an inorganic material may be used. Further, a polarizing plate may also be referred to as a polarizing film due to its shape.

As shown in FIG. 1B, the first polarizing plate 103 and the second polarizing plate 104 are stacked so that absorption axis B and absorption axis A are parallel to each other. This parallel state is referred to as a parallel nicol state.

Note that a polarizing plate has a transmissive axis in a direction perpendicular to an absorption axis, as characteristics. Therefore, the case where transmissive axes are parallel to each other can also be referred to as a parallel nicol state.

By thus stacking polarizing plates so that absorption axes thereof each having a different extinction coefficient are in a parallel nicol state, light leakage in a direction of the absorption axis can be reduced. Further, light leakage can be reduced as compared to the case where a pair of single-layer polarizing plates are provided. Accordingly, a contrast ratio of the display device can be enhanced.

Embodiment Mode 2

In this embodiment mode, description is made of a display device including a retardation film in addition to stacked polarizing plates, which is different from Embodiment Mode 1.

Figure 2A:
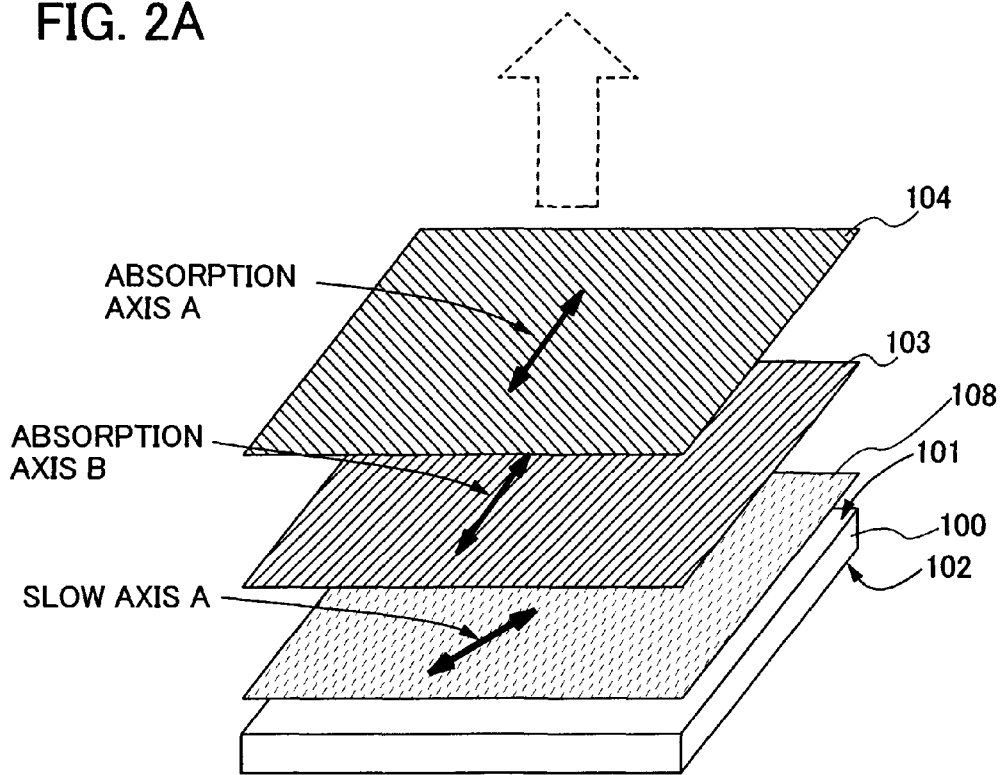
FIGS. 2A and 2B are views each showing a display device of the invention.
Figure 2B:
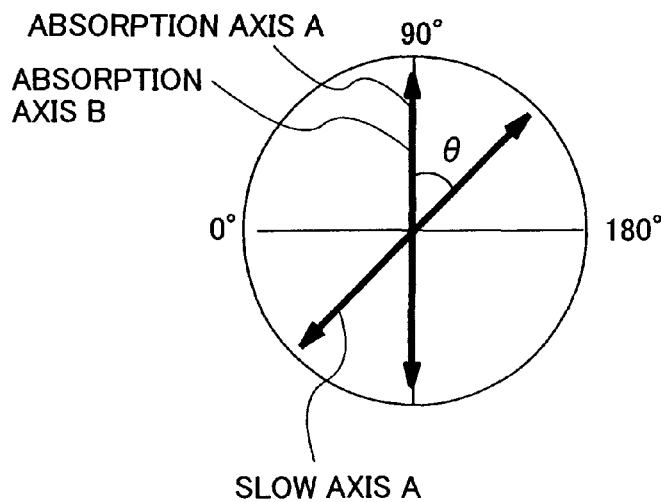

FIGS. 2A and 2B show a display device including a retardation film in addition to stacked polarizing plates each having an extinction coefficient of an absorption axis which is different from that of an absorption axis of another polarizing plate. A retardation film and stacked polarizing plates each having an extinction coefficient of an absorption axis which is different from that of an absorption axis of another polarizing plate are provided in this order outside the light-transmissive substrates, that is, on sides which are not in contact with the layer having a display element. A first retardation film 108, first polarizing plate 103 and a second polarizing plate 104 are provided on the first substrate 101 side. Here, an extinction coefficient of absorption axis B of the first polarizing plate 103 and that of absorption axis A of the second polarizing plate 104 are different. A combination of a retardation film which is a λ/4 plate in this case and stacked polarizing plates is also referred to as a circularly polarizing plate having stacked polarizing plates (linearly polarizing plates). Further, as shown in FIG. 2B, stacked polarizing plates are arranged in a parallel nicol state so that a slow axis A of a first retardation film 108, and an absorption axis B of the first polarizing plate 103 and an absorption axis A of the second polarizing plate 104 make an angle θ of 45 degrees.

Note that a retardation film has a fast axis in a direction perpendicular to a slow axis, as characteristics. Therefore, an arrangement can be determined based on the fast axis instead of the slow axis. Although FIGS. 2A and 2B show a case of a circularly polarizing plate, an angle of the slow axis of the retardation film is not limited to this. Note that a plurality of retardation films may be used.

As a retardation film, a film having liquid crystal with hybrid orientation, a film having liquid crystal with twisted orientation, a uniaxial retardation film, or a biaxial retardation film can be used. Such a retardation film can widen a viewing angle of a display device.

In order to form a uniaxial retardation film, a resin is stretched in one direction, whereas in order to form a biaxial retardation film, a resin is uniaxially-stretched in a horizontal direction and then uniaxially-stretched weakly in a vertical direction. For the resin, a cycloolefin polymer (COE), polycarbonate (PC), polymethylmethacrylate (PMMA), polystyrene (PS), polyether sulfone (PES), polyphenylene sulfide (PPS), poly ethylene terephthalate (PET), polyethylene naphthalate (PEN), polypropylene (PP), a polyphenylene oxide (PPO), polyalylate (PAR), polyimide (PI), polytetrafluoroethylene (PTFE), or the like can be used here.

Note that in order to obtain a film having liquid crystal with hybrid orientation, discotic liquid crystals or nematic liquid crystals are hybrid-aligned using a triacetylcellulose (TAC) film as a base. A retardation film can be attached to a light-transmissive substrate while attached to a polarizing plate.

By thus stacking polarizing plates so that absorption axes thereof each having a different coefficient are in a parallel nicol state, light leakage in a direction of the absorption axes can be reduced. Further, light leakage can be reduced as compared to the case where a pair of single-layer polarizing plates are provided. Accordingly, a contrast ratio of the display device can be enhanced.

Further, the inveniton can provide a display device with a wider viewing angle since a retardation film is included.

Embodiment Mode 3

Figure 3A:
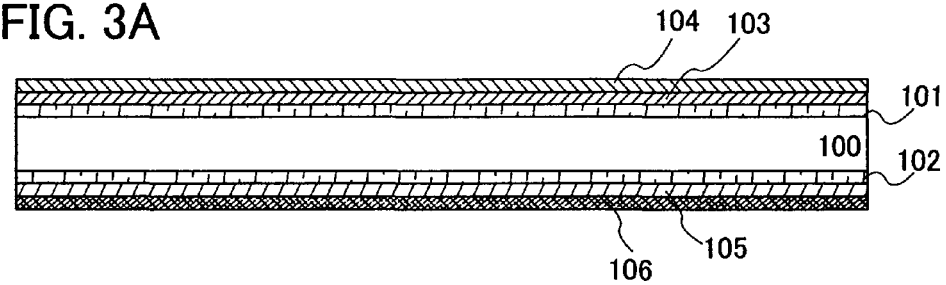
FIGS. 3A and 3B are a cross sectional view and a perspective view showing a liquid crystal dipslay device of the invention, respectively.
Figure 3B:
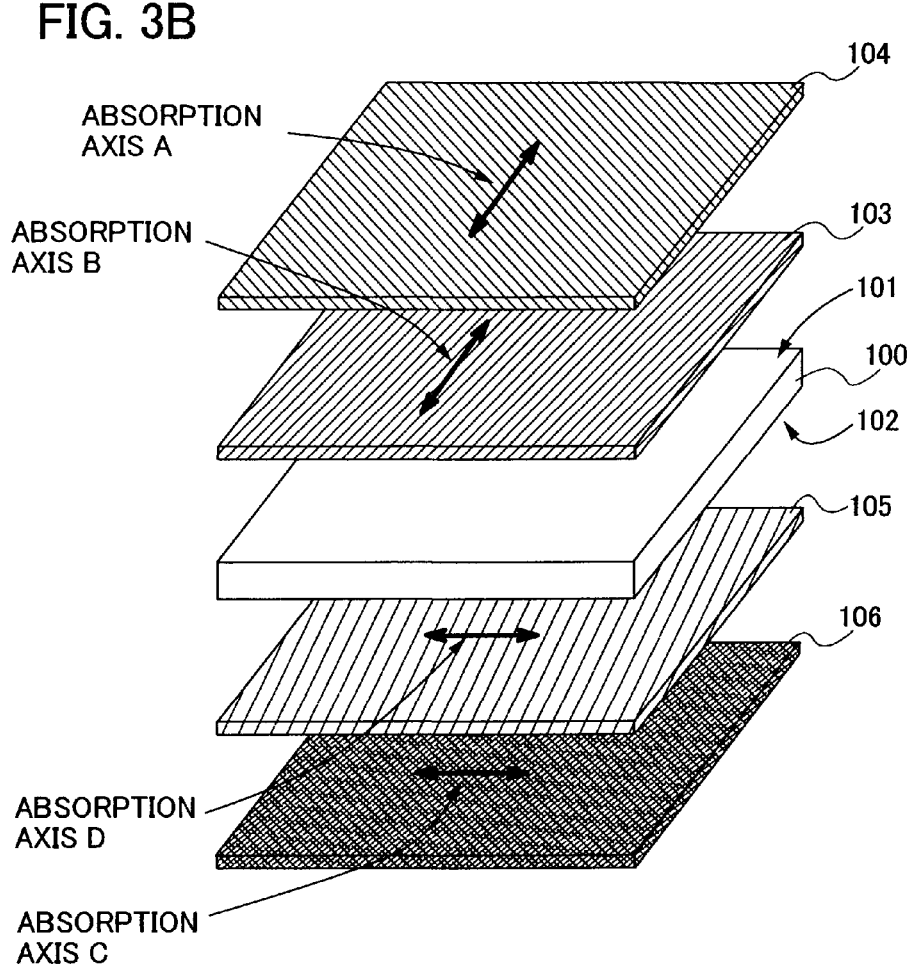

In this embodiment mode, description is made of a display device including a pair of stacks of polarizing plates in which each polarizing plate has an extinction coefficient of an absorption axis which is different from that of an absorption axis of another polarizing plate, which is different from embodiment modes described above, with reference to FIGS. 3A and 3B. FIG. 3A shows a cross sectional view of a display device provided with a pair of polarizing plates having a stacked structure, and FIG. 3B shows a perspective view of the display device.

As shown in FIG. 3A, a layer 100 having a display element is sandwiched between the first substrate 101 and the second substrate 102 which are arranged so as to face each other. Each of the substrates are a light-transmissive substrate. The substrates can be formed of, for example, a glass substrate such as barium borosilicate glass or aluminoborosilicate glass, a quartz substrate, or the like. Further, a substrate formed of plastic represented by polyethylene terephthalate (PET), polyethylene naphthalate (PEN), and polyether sulfone (PES), or a synthetic resin having flexibility such as acrylic can be applied to the substrates.

Stacked polarizing plates each having an extinction coefficient of an absorption axis which is different from that of an absorption axis of another polarizing plate are provided outside the substrates, that is, on sides which are not in contact with the layer having a display element. A first polarizing plate 103 and a second polarizing plate 104 are provided on the first substrate 101 side, whereas a third polarizing plate 105 and a fourth polarizing plate 106 are provided on the second substrate 102 side. Here, an extinction coefficient of absorption axis B of the first polarizing plate 103 and that of absorption axis A of the second polarizing plate 104 are different. Further, an extinction coefficient of absorption axis D of the third polarizing plate 105 and that of absorption axis C of the fourth polarizing plate 106 are different.

These polarizing plates can be formed of a known material. For example, a structure where an adhesive layer, TAC (triacetylcellulose), a mixed layer of PVA (polyvinyl alcohol) and iodine, and TAC are sequentially stacked from the substrate side can be used. Polarization degree can be controlled by the mixed layer of PVA (polyvinyl alcohol) and iodine. Alternatively, a polarizing plate using an inorganic material may be used. Further, a polarizing plate may also be referred to as a polarizing film due to its shape.

As shown in FIG. 3B, the first polarizing plate 103 and the second polarizing plate 104 are stacked so that absorption axis B and absorption axis A are parallel to each other. This parallel state is referred to as a parallel nicol state. In a similar manner, the third polarizing plate 105 and the fourth polarizing plate 106 are stacked so that absorption axis D and absorption axis C are arranged in parallel, that is, arranged so as to be in a parallel nicol state. A pair of the stacked polarizing plates are arranged so that absorption axes thereof are perpendicular to each other. This perpendicular state is referred to as a cross nicol state.

Note that a polarizing plate has a transmissive axis in a direction perpendicular to an absorption axis, as characteristics. Therefore, the case where transmissive axes are parallel to each other can also be referred to as a parallel nicol state. Meanwhile, the case where transmissive axes are perpendicular to each other can also be referred to as a cross nicol state.

By thus stacking polarizing plates so that absorption axes thereof each having a different extinction coefficient are in a parallel nicol state, light leakage in a direction of the absorption axes can be reduced. Further, by arranging a pair of stacks of polarizing plates so as to be in a cross nicol state, light leakage can be reduced as compared to the case where a pair of single-layer polarizing plates are provided so as to be in a cross nicol state. Accordingly, a contrast ratio of the display device can be enhanced.

Embodiment Mode 4

In this embodiment mode, description is made of a display device including a retardation film in addition to a pair of stacks of polarizing plates, which is different from embodiment modes described above.

Figure 4A:
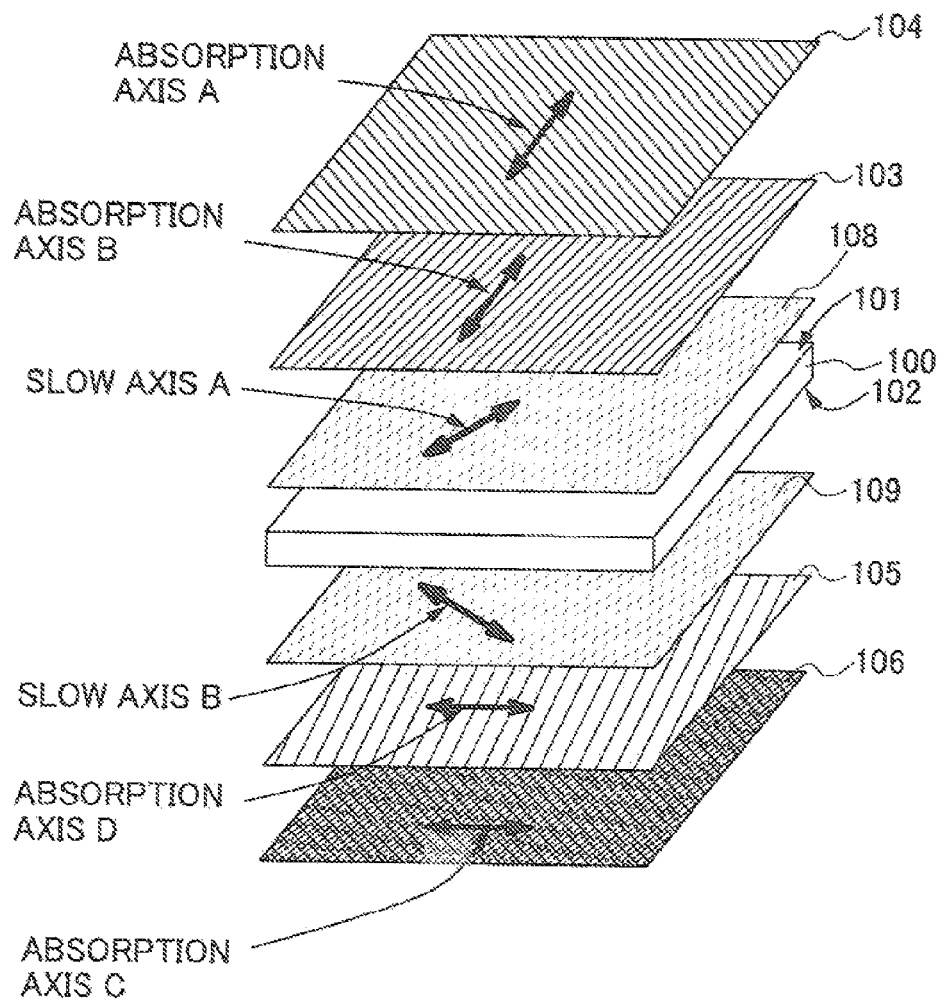
FIGS. 4A and 4B are views each showing a display device of the invention.
Figure 4B:
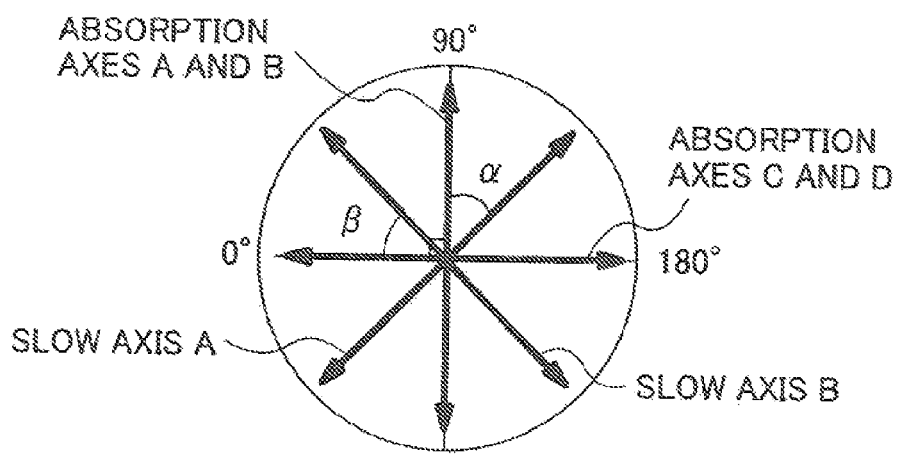

FIGS. 4A and 4B show a display device including a retardation film in addition to a pair of stacks of polarizing plates in which each polarizing plate has an extinction coefficient of an absorption axis which is different from that of an absorption axis of another polarizing plate. A retardation film and stacked polarizing plates each having an extinction coefficient of an absorption axis which is different from that of an absorption axis of another polarizing plate are provided in this order outside the light-transmissive substrates, that is, on sides which are not in contact with the layer having a display element. The first retardation film 108, the first polarizing plate 103, and the second polarizing plate 104 are provided on the first substrate 101 side. A second retardation film 109, the third polarizing plate 105, and the fourth polarizing plate 106 are provided on the second substrate 102 side. Here, an extinction coefficient of absorption axis B of the first polarizing plate 103 and that of absorption axis A of the second polarizing plate 104 are different. Further, an extinction coefficient of absorption axis D of the third polarizing plate 105 and that of absorption axis C of the fourth polarizing plate 106 are different.

The first retardation film 108, the first polarizing plate 103, and the second polarizing plate 104 are provided outside of the first substrate 101 side. The first polarizing plate 103 and the second polarizing plate 104 are stacked so that absorption axis B and absorption axis A are parallel to each other. That is, the first polarizing plate 103 and the second polarizing plate 104 are arranged so as to be in a parallel nicol state. The first retardation film 108, the first polarizing plate 103, and the second polarizing plate 104 are arranged so that the fast axis A of the first retardation film 108 deviates α degrees from absorption axes B and A.

FIG. 4B shows angles of the absorption axes A and B and the slow axis A, and deviation thereof. The absorption axes A and B make an angle of 90 degrees, and the slow axis A deviates α degrees from the absorption axes A and B.

Meanwhile, the second retardation film 109, the third polarizing plate 105, and the fourth polarizing plate 106 are provided outside of the second substrate 102 side. The third polarizing plate 105 and the fourth polarizing plate 106 are stacked so that absorption axis D and absorption axis C are parallel to each other. That is, the third polarizing plate 105 and the fourth polarizing plate 106 are arranged so as to be in a parallel nicol state. The second retardation film 109, the third polarizing plate 105, and the fourth polarizing plate 106 are arranged so that the slow axis B deviates β degrees from absorption axes D and C.

FIG. 4B shows angles of the absorption axes C and D and the slow axis B, and deviation thereof. The absorption axes C and D make an angle of 0 degrees, and the slow axis B deviates αβ degrees from the absorption axes C and D.

The absorption axes A and B of the stacked polarizing plates provided over the first substrate 101 are perpendicular to the absorption axes C and D of the stacked polarizing plates provided over the second substrate 102. That is, polarizing plates facing each other are arranged so as to be in a cross nicol state.

In the case where a λ/4 plate is used for a retardation film, and each of the deviations α and β are 45 degrees, that is, the slow axis A is at a 135-degree angle and the slow axis B is at a 45-degree angle, a combination of a λ/4 plate and stacked polarizing plates is also referred to as a circularly polarizing plate having stacked polarizing plates (linearly polarizing plates). In this case, a circularly polarizing plate has a function to prevent reflection from a layer 100 including a display element even if light from outside a display device (outside light) enters the layer 100 having the display element. Further, contrast of display by the display element can be enhanced because of the stacked polarizing plates each having a different extinction coefficient. Note it may be that a plurality of retardation films plates are used in case of the retardation films functioning as λ/4 plates over a wide wavelength band; therefore, the angles of the slow axis of the retardation plate are not limited to this.

When a film having liquid crystal with hybrid orientation, a film having liquid crystal with twisted orientation, a uniaxial retardation film, a biaxial retardation film, or a combination of a plurality of them is used as a retardation film, such a retardation film can widen a viewing angle of a display device. Further, contrast of display by the display element can be enhanced because of the stacked polarizing plates each having a different extinction coefficient.

In order to form a uniaxial retardation film, a resin is stretched in one direction, whereas in order to form a biaxial retardation film, a resin is uniaxially-stretched in a horizontal direction and then uniaxially-stretched weakly in a vertical direction. For the resin, a cycloolefin polymer (COE), polycarbonate (PC), polymethylmethacrylate (PMMA), polystyrene (PS), polyether sulfone (PES), polyphenylene sulfide (PPS), poly ethylene terephthalate (PET), polyethylene naphthalate (PEN), polypropylene (PP), a poliophenylene oxide (PPO), polyalylate (PAR), polyimide (PI), polytetrafluoroethylene (PTFE), or the like can be used here.

Note that in order to obtain a film having liquid crystal with hybrid orientation, discotic liquid crystals or nematic liquid crystals are hybrid-aligned using a triacetylcellulose (TAC) film as a base. A retardation film can be attached to a light-transmissive substrate while attached to a polarizing plate.

Note that a polarizing plate has a transmissive axis in a direction perpendicular to an absorption axis, as characteristics. Therefore, the case where transmissive axes are parallel to each other can also be referred to as a parallel nicol state. Meanwhile, the case where transmissive axes are perpendicular to each other can also be referred to as a cross nicol state.

In this manner, by stacking polarizing plates so that absorption axes thereof each having a different extinction coefficient are in a parallel nicol state, and arranging polarizing plates facing each other so as to be in a cross nicol state, light leakage can be reduced as compared to the case where single-layer polarizing plates are provided so as to be in a cross nicol state. Accordingly, a contrast ratio of the display device can be enhanced.

Further, the inveniton can provide a display device for which a function of preventing reflection from outside light is enhanced or a display device with a wider viewing angle, since a retardation film is included.

Embodiment Mode 5

In this embodiment mode, description is made of a specific structure of a liquid crystal display device including a pair of stacks of polarizing plates in which each polarizing plate has an extinction coefficient of an absorption axis which is different from that of an absorption axis of another polarizing plate.

Figure 5:
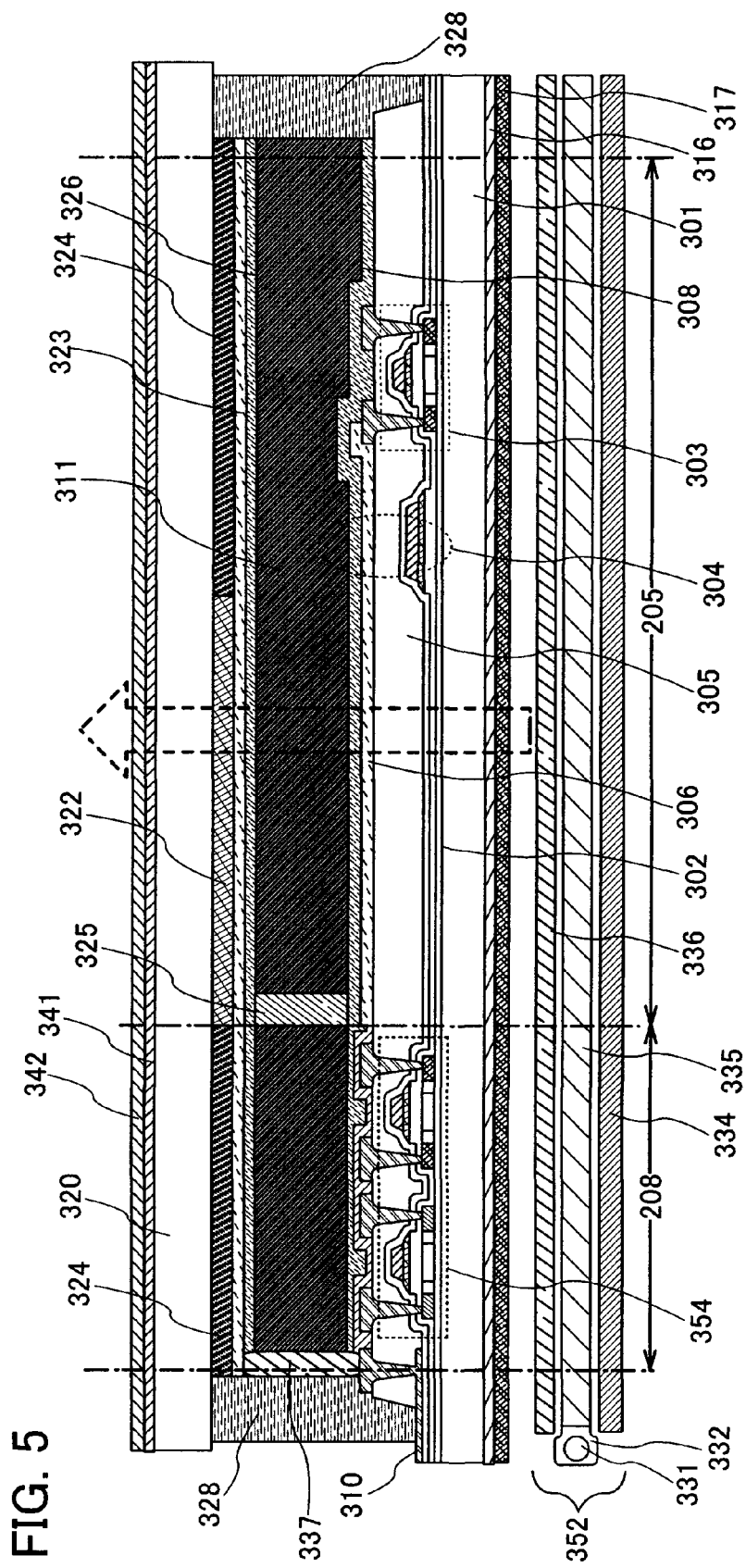
FIG. 5 is a cross sectional view showing a liquid crystal dipslay device of the invention.

FIG. 5 shows a cross sectional view of a liquid crystal display device provided with polarizing plates having a stacked structure, in which each polarizing plate has an extinction coefficient of an absorption axis which is different from that of an absorption axis of another polarizing plate.

The liquid crystal display device includes a pixel portion 205 and a driver circuit portion 208. In the pixel portion 205 and the driver circuit portion 208, a base film 302 is provided over a substrate 301. An insulating substrate similar to the aforementioned embodiment mode can be used as the substrate 301. There is concern that a substrate formed of a synthetic resin generally has a lower allowable temperature limit than other substrates; however, it can be employed by displacing after a manufacturing process using a higher heat-resistant substrate.

The pixel portion 205 is provided with a transistor as a switching element with the base film 302 interposed therebetween. In this embodiment mode, a thin film transistor (TFT) is used as the transistor, which is referred to as a switching TFT 303. A TFT can be formed by many methods. For example, a crystalline semiconductor film is used as an active layer. A gate electrode is provided over the crystalline semiconductor film with a gate insulating film interposed therebetween. An impurity element can be added to the active layer by using the gate electrode. Since an impurity element is added using the gate electrode in this manner, a mask for adding the impurity element is not required to be formed. The gate electrode may have a single layer structure or a stacked-layer structure. An impurity region can be formed as a high concentration impurity region and a low concentration impurity region by controlling the concentration thereof. Such a TFT having a low concentration impurity region is referred to as an LDD (Lightly Doped Drain) structure. The low concentration impurity region can be formed so as to overlap the gate electrode. Such a TFT is referred to as a GOLD (Gate Overlapped LDD) structure. In FIG. 5, the switching TFT 303 having a GOLD structure is shown. The polarity of the switching TFT 303 is an n-type as phosphorus (P) or the like is used for an impurity region thereof. In the case of forming a p-type TFT, boron (B) or the like may be added. After that, a protective film covering a gate electrode and the like is formed. A dangling bond in the crystalline semiconductor film can be terminated by hydrogen elements mixed in the protective film. Further, in order to enhance the flatness, an interlayer insulating film 305 may be formed. The interlayer insulating film 305 may be formed using an organic material, an inorganic material, or a stacked structure of these. Openings are formed in the interlayer insulating film 305, the protective film, and the gate insulating film; thereby wirings connected to the impurity regions are formed. In this manner, the switching TFT 303 can be formed. It is to be noted that the invention is not limited to the structure of the switching TFT 303.

Then, a pixel electrode 306 connected to the wiring is formed.

Further, a capacitor 304 can be formed at the same time as the switching TFT 303. In this embodiment mode, the capacitor 304 is formed of a stack of a conductive film formed at the same time as the gate electrode, the protective film, the interlayer insulating film 305, and the pixel electrode 306.

Further, a pixel portion and a driver circuit portion can be formed over one substrate by using a crystalline semiconductor film. In that case, transistors in the pixel portion and transistors in the driver circuit portion 208 are formed at the same time. The transistors used for the driver circuit portion 208 form a CMOS circuit; therefore, they are referred to as a CMOS circuit 354. Each TFT which forms the CMOS circuit 354 may have a similar structure to the switching TFT 303. Further, the LDD structure can be used instead of the GOLD structure, and a similar structure is not necessarily required.

An alignment film 308 is formed so as to cover the pixel electrode 306. The alignment film 308 is subjected to rubbing treatment. This rubbing treatment is not performed in a case of a specific mode of a liquid crystal, for example, in the case of a VA mode.

Next, a counter substrate 320 is provided. A color filter 322 and a black matrix (BM) 324 can be provided on an inside of the counter substrate 320, that is, on the side which is in contact with a liquid crystal. These can be formed by known methods; however, a droplet discharging method (representatively an ink-jet method) by which a predetermined material is dropped can eliminate the waste of the material. Further, the color filter 322 and the like are provided in a region where the switching TFT 303 is not provided. That is to say, the color filter 322 is provided so as to face a light-transmissive region, that is, an opening region. It is to be noted that the color filter and the like may be formed of materials which exhibit red (R), green (G), and blue (B) in the case where a liquid crystal display device performs full-color display, and a material which exhibits at least one color in the case of mono-color display.

It is to be noted that the color filter is not provided in some cases when a diode (LED) of RGB and the like are arranged in a backlight, and a successive additive color mixing method (field sequential method) in which color display is performed by time division. The black matrix 324 is provided to also reduce reflection of external light due to wirings of the switching TFT 303 and the CMOS circuit 354. Therefore, the black matrix 324 is provided so as to overlap with the switching TFT 303 or the CMOS circuit 354. Note that the black matrix 324 may be provided so as to overlap with the capacitor 304. Accordingly, reflection by a metal film forming the capacitor 304 can be prevented.

Then, the counter electrode 323 and an alignment film 326 are provided. The alignment film 326 is subjected to rubbing treatment. This rubbing treatment is not performed in a case of a specific mode of a liquid crystal, for example, in the case of a VA mode.

It is to be noted that the wiring included in the TFT, the gate electrode, the pixel electrode 306, and the counter electrode 323 can be selected from indium tin oxide (ITO), IZO (indium zinc oxide) in which zinc oxide (ZnO) is mixed in indium oxide, a conductive material in which silicon oxide ($SiO_2$) is mixed in indium oxide, organic indium, organotin, a metal such as tungsten (W), molybdenum (Mo), zirconium (Zr), hafnium (Hf), vanadium (V), niobium (Nb), tantalum (Ta), chromium (Cr), cobalt (Co), nickel (Ni), titanium (Ti), platinum (Pt), aluminum (Al), or copper (Cu), an alloy thereof, and metal nitride thereof.

Such a counter substrate 320 is attached to the substrate 301 by using a sealing material 328. The sealing material 328 can be drawn over the substrate 301 or the counter substrate 320 by using a dispenser or the like. Further, a spacer 325 is provided in a part of the pixel portion 205 and the driver circuit portion 208 in order to hold a space between the substrate 301 and the counter substrate 320. The spacer 325 has a shape such as a columnar shape or a spherical shape.

A liquid crystal 311 is injected between the substrate 301 and the counter substrate 320 attached to each other in this manner. It is preferable to inject the liquid crystal in vacuum. The liquid crystal 311 can be formed by a method other than the injecting method. For example, the liquid crystal 311 may be dropped and then the counter substrate 320 may be attached. Such a dropping method is preferably employed when using a large substrate to which the injecting method cannot be applied easily.

The liquid crystal 311 includes a liquid crystal molecule of which tilt is controlled by the pixel electrode 306 and the counter electrode 323. Specifically, the tilt of the liquid crystal molecule is controlled by a voltage applied to the pixel electrode 306 and the counter electrode 323. Such a control is performed using a control circuit provided in the driver circuit portion 208. It is to be noted that the control circuit is not necessarily formed over the substrate 301 and a circuit connected through a connecting terminal 310 may be used. In this case, an anisotropic conductive film containing conductive particles can be used so as to be connected to the connecting terminal 310. Further, the counter electrode 323 is electrically connected to a part of the connecting terminal 310, thereby a potential of the counter electrode 323 can be common. For example, a bump 337 can be used for the conduction.

Next, description is made of a structure of a backlight unit 352. The backlight unit 352 includes a cold cathode tube, a hot cathode tube, a diode, an inorganic EL, or an organic EL as a light source 331 which emits fluorescence, a lamp reflector 332 to effectively lead fluorescence to a light guide plate 335, the light guide plate 335 by which light is totally reflected and led to the entire surface, a diffusing plate 336 for reducing variations in brightness, and a reflective plate 334 for reusing light leaked under the light guide plate 335.

A control circuit for adjusting the luminance of the light source 331 is connected to the backlight unit 352. The luminance of the light source 331 can be controlled by a signal supplied from the control circuit.

Further, stacks of polarizing plates 316 and 317 in which each polarizing plate has an extinction coefficient of an absorption axis which is different from that of an absorption axis of another polarizing plate are provided between the substrate 301 and the backlight unit 352. Stacked polarizing plates 341 and 342 each having a different extinction coefficient with respect to an absorption axis of each polarizing plate are provided over the counter substrate 320 as well. The polarizing plate 316 may be attached to the substrate 301 with a retardation film interposed therebetween, and the polarizing plate 341 may be attached to the substrate 320 with a retardation film interposed therebetween.

By providing stacked polarizing plates each having a different extinction coefficient with respect to an absorption axis of each polarizing plate in such a liquid crystal display device, a contrast ratio can be enhanced. Further, in the invention, a plurality of polarizing plates which are different from each other are stacked, which is different from a structure in which a film thickness of a polarizing plate is simply increased. It is preferable in that a contrast ratio can be enhanced as compared to the structure in which a film thickness of a polarizing plate is increased.

In this embodiment mode, description is made using a display device having a liquid crystal element; however, the invention can be applied to a light emitting device having a self-light emitting element as well. A light emitting device is provided with stacked polarizing plates, whereby a contrast ratio can be enhanced. Note that when a light emitting device has a structure in which a pair of substrates facing each other are light-transmissive substrates and emit light to both directions, stacked polarizing plates each having an extinction coefficient of an absorption axis which is different from that of an absorption axis of another polarizing plate are provided outside each of the substrates, whereby a contrast ratio can be enhanced. The light emitting device can be a display device which has higher moving image response speed and a thinner shape than a liquid crystal display device.

Further, a combination of a polarizing plate and a retardation film can function as a circularly polarizing plate. Even in the case of a structure where a retardation film is provided between a polarizing plate and a substrate, a contrast ratio can be enhanced since a feature of the invention is stacked polarizing plates.

Embodiment Mode 6

In this embodiment mode, description is made of a liquid crystal display device which has polarizing plates having a stacked-layer structure in which each absorption axis has a different extinction coefficient but uses a TFT having an amorphous semiconductor film unlike in the case of the aforementioned embodiment modes.

Figure 6:
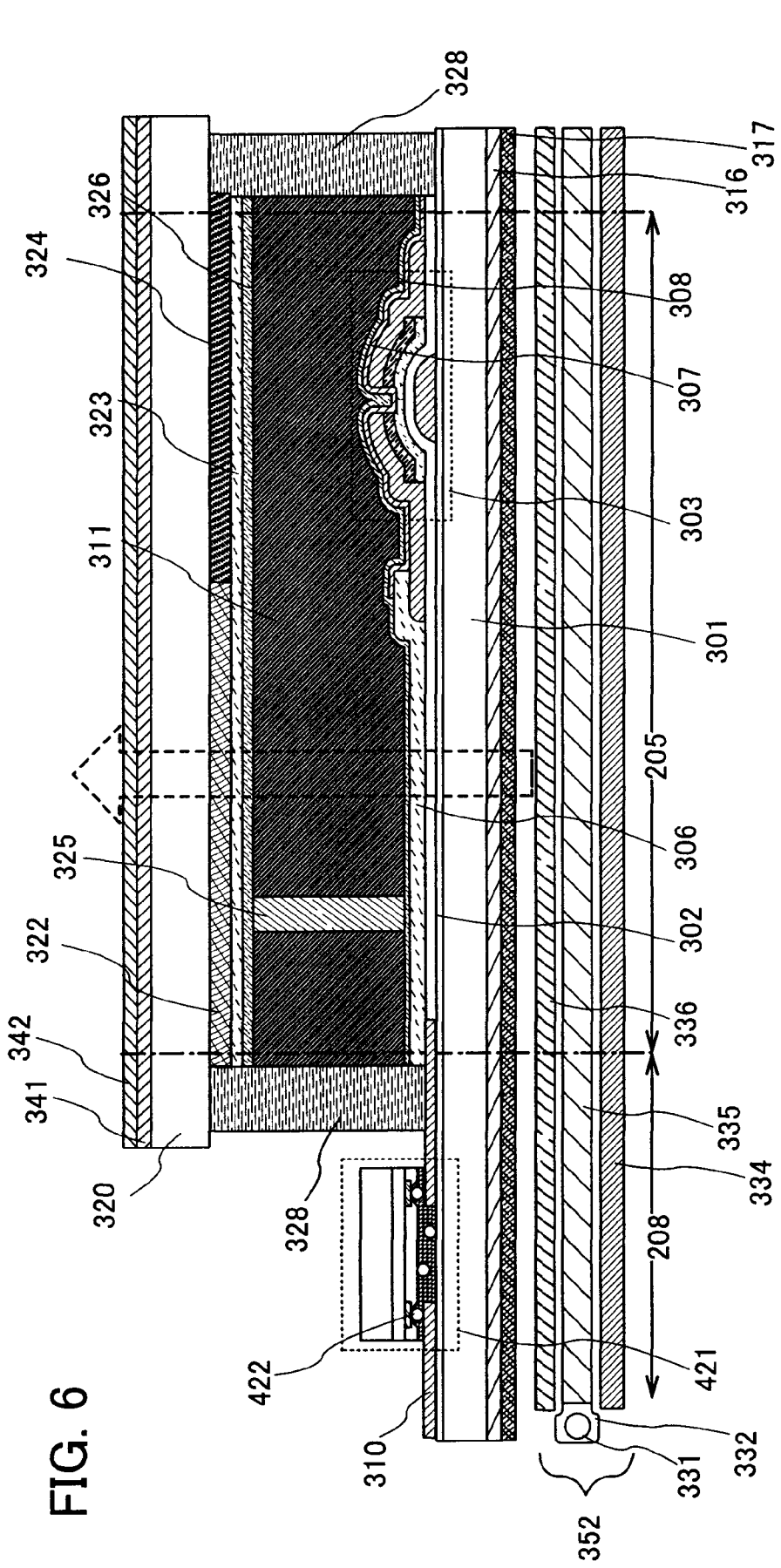
FIG. 6 is a cross sectional view showing a liquid crystal dipslay device of the invention.

FIG. 6 shows a structure of a liquid crystal display device including a transistor using an amorphous semiconductor film for a switching element (hereinafter referred to as an amorphous TFT). The pixel portion 205 is provided with the switching TFT 303 formed of an amorphous TFT. The amorphous TFT can be formed by a known method. For example, in the case of forming a channel-etch type, a gate electrode is formed over the base film 302; a gate insulating film is formed so as to cover the gate electrode; and then, an n-type semiconductor film, an amorphous semiconductor film, a source electrode, and a drain electrode are formed. An opening is formed in the n-type semiconductor film by using the source electrode and the drain electrode. A part of the amorphous semiconductor film is also removed in this case; therefore, this TFT is referred to as a channel-etch type. After that, a protective film 307 is formed, thereby an amorphous TFT can be formed. Further, there is also a channel protective type amorphous TFT where a protective film is provided so that an amorphous semiconductor film is not removed when forming an opening in the n-type semiconductor film by using the source electrode and the drain electrode. Other structures may be formed similarly to the channel-etch type.

Subsequently, the alignment film 308 is formed similarly to FIG. 5, and then rubbing treatment is performed. This rubbing treatment is not performed in a specific mode of a liquid crystal, for example, in the case of a VA mode.

Further, the counter substrate 320 is provided similarly to FIG. 5 and attached by using the sealing material 328. By injecting the liquid crystal 311 between them, a liquid crystal display device can be formed.

Similarly to FIG. 5, the stacks of polarizing plates 316 and 317 in which each polarizing plate has an extinction coefficient of an absorption axis which is different from that of an absorption axis of another polarizing plate are provided between the substrate 301 and the backlight unit 352. The counter substrate 320 is provided with the stacks of polarizing plates 341 and 342 in which each polarizing plate has an extinction coefficient of an absorption axis which is different from that of an absorption axis of another polarizing plate. The polarizing plate 316 may be attached to the substrate 301 with a retardation film interposed therebetween, and the polarizing plate 341 may be attached to the substrate 320 with a retardation film interposed therebetween.

In the case of forming a liquid crystal display device by using an amorphous TFT as the switching TFT 303, an IC 421 formed of a silicon wafer can be mounted as a driver on the driver circuit portion 208 in consideration of operating performance. For example, a signal to control the switching TFT 303 can be supplied by connecting a wiring of the IC 421 and a wiring connected to the switching TFT 303 by using an anisotropic conductor having a conductive particle 422. It is to be noted that a mounting method of the IC is not limited to this and the IC may be mounted by a wiring bonding method.

Further, the IC can be connected to a control circuit through the connecting terminal 310. At this time, an anisotropic conductive film including the conductive particle 422 can be used to connect the IC with the connecting terminal 310.

Since other structures are similar to FIG. 5, description thereof is omitted here.

By providing stacked polarizing plates each having the stacks of polarizing plates in which each polarizing plate has an extinction coefficient of an absorption axis which is different from that of an absorption axis of another polarizing plate in such a liquid crystal display device, a contrast ratio can be enhanced. Further, in the invention, a plurality of polarizing plates which are different from each other are stacked, which is different from a structure in which a film thickness of a polarizing plate is simply increased. It is preferable in that a contrast ratio can be enhanced as compared to the structure in which a film thickness of a polarizing plate is increased.

Embodiment Mode 7

In this embodiment mode, description is made of operation of each circuit or the like included in a liquid crystal display device.

Figure 7A:
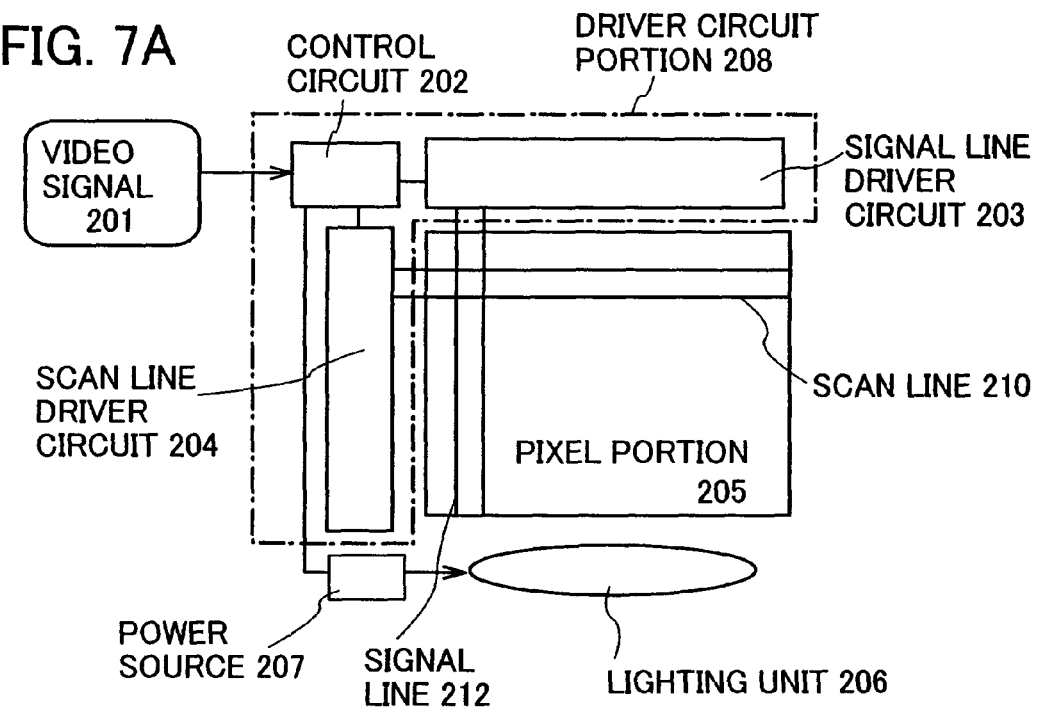
FIGS. 7A to 7C are block diagrams each showing a liquid crystal display device of the inveniton.
Figure 7B:
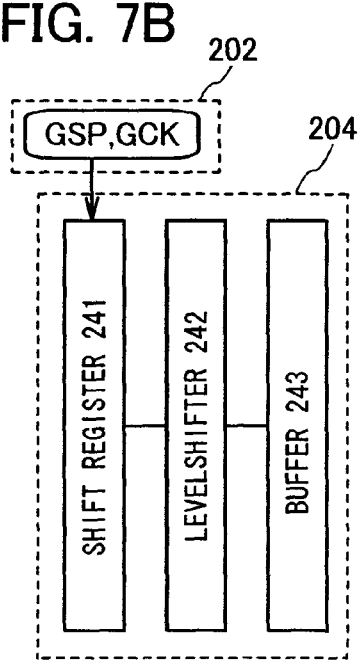
Figure 7C:
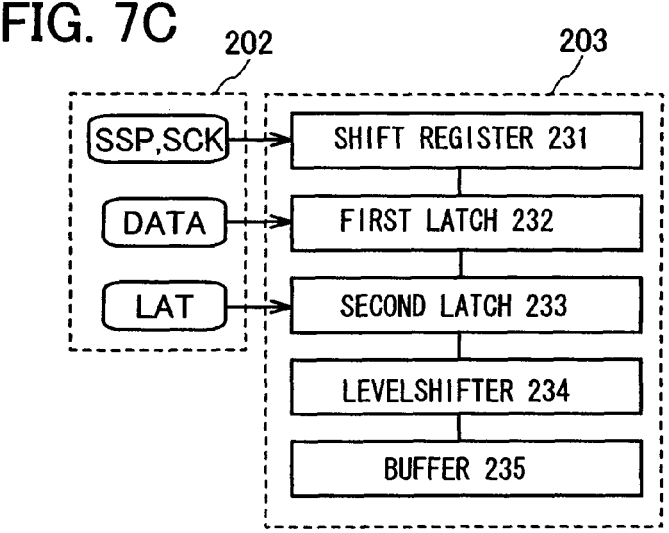

FIGS. 7A to 7C show system block diagrams of the pixel portion 205 and the driver circuit portion 208 included in a liquid crystal display device.

In the pixel portion 205, a plurality of pixels are included and switching elements are provided in an intersecting region of the signal line 212 and the scan line 210. By the switching elements, application of a voltage to control tilt of liquid crystal molecules can be controlled. Such a structure where switching elements are provided in respective intersecting regions is referred to as an active type. The pixel portion of the invention is not limited to such an active type, and may have a passive type structure instead. The passive type can be formed by a simple process since each pixel does not have a switching element.

The driver circuit portion 208 includes the control circuit 202, the signal line driver circuit 203, and the scan line driver circuit 204. The control circuit 202 has a function to control a gray scale in accordance with display contents of the pixel portion 205. Therefore, the control circuit 202 inputs a signal generated in accordance with a video signal 201, to the signal line driver circuit 203 and the scan line driver circuit 204. When a switching element is selected through the scan line 210 in accordance with the scan line driver circuit 204, a voltage is applied to a pixel electrode in a selected intersecting region. The value of this voltage is determined in accordance with a signal inputted from the signal line driver circuit 203 through the signal line 212.

Further, in the control circuit 202, a signal to control power supplied to a lighting unit 206 is generated, and the signal is inputted to the power source 207 of the lighting unit 206. The backlight unit described in the aforementioned embodiment mode can be used for the lighting unit. Note that the lighting unit includes a front light besides a backlight. A front light is a plate-like light unit including an illuminant and a light guiding body, which is attached to a front side of a pixel portion and illuminates the whole place. By such a lighting unit, the pixel portion can be evenly illuminated with low power consumption.

Further, as shown in FIG. 7B, the scan line driver circuit 204 includes circuits which function as a shift register 241, a level shifter 242, and a buffer 243. Signals such as a gate start pulse (GSP) and a gate clock signal (GCK) are inputted to the shift register 241. It is to be noted that the scan line driver circuit of the invention is not limited to the structure shown in FIG. 7B.

Further, as shown in FIG. 7C, the signal line driver circuit 203 includes circuits which function as a shift register 231, a first latch 232, a second latch 233, a level shifter 234, and a buffer 235. The circuit functioning as the buffer 235 is a circuit having a function to amplify a weak signal and includes an operational amplifier and the like. Signals such as start pulses (SSP) are inputted to the level shifter 234, and data (DATA) such as video signals is inputted to the first latch 232. Latch (LAT) signals can be temporarily held in the second latch 233, and are inputted to the pixel portion 205 concurrently. This operation is referred to as line sequential driving. Therefore, a pixel which performs not line sequential driving but dot sequential driving does not require the second latch. Thus, the signal line driver circuit of the invention is not limited to the structure shown in FIG. 7C.

The signal line driver circuit 203, the scan line driver circuit 204, and the pixel portion 205 as described above can be formed of semiconductor elements provided over one substrate. The semiconductor element can be formed using a thin film transistor provided over a glass substrate. In this case, a crystalline semiconductor film may be applied to a semiconductor element (see Embodiment Mode 5). A crystalline semiconductor film can form a circuit included in a driver circuit portion since it has high electrical characteristics, in particular, mobility. Further, the signal line driver circuit 203 and the scan line driver circuit 204 may be mounted on a substrate by using an IC (Integrated Circuit) chip. In this case, an amorphous semiconductor film can be applied to a semiconductor element in a pixel portion (see Embodiment Mode 6).

By providing stacked polarizing plates each having an extinction coefficient of an absorption axis which is different from that of an absorption axis of another polarizing plate in such a liquid crystal display device, a contrast ratio can be enhanced. That is, by the stacked polarizing plates each having an extinction coefficient of an absorption axis which is different from that of an absorption axis of another polarizing plate, a contrast ratio of light from the lighting unit controlled by the control circuit can be enhanced.

Embodiment Mode 8

In this embodiment mode, a structure of a backlight is described. A backlight is provided in a display device as a backlight unit having a light source, and the light source of the backlight unit is surrounded by a reflection plate for scattering light efficiently.

Figure 8A:
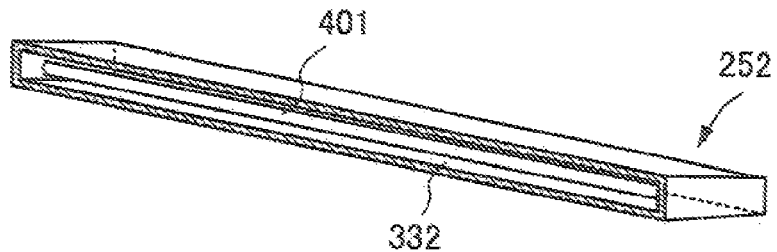
FIGS. 8A to 8D are cross sectional views each showing an irradiation unit included in a liquid crystal display device of the invention.

As shown in FIG. 8A, a cold cathode tube 401 can be used as a light source of a backlight unit 252. In addition, the lamp reflector 332 can be provided to reflect light from the cold cathode tube 401 efficiently. The cold cathode tube 401 is often used for a large display device for intensity of luminance from the cold cathode tube. Therefore, such a backlight unit having a cold cathode tube can be used for a display of a personal computer.

Figure 8B:
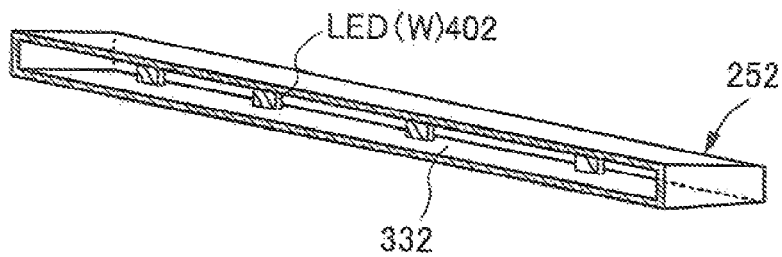

As shown in FIG. 8B, a diode (LED) 402 can be used as light sources of the backlight unit 252. For example, diodes (W) 402 which emit white light are provided at the predetermined intervals. In addition, the lamp reflector 332 can be provided to reflect light from the diode (W) 402 efficiently.

Figure 8C:
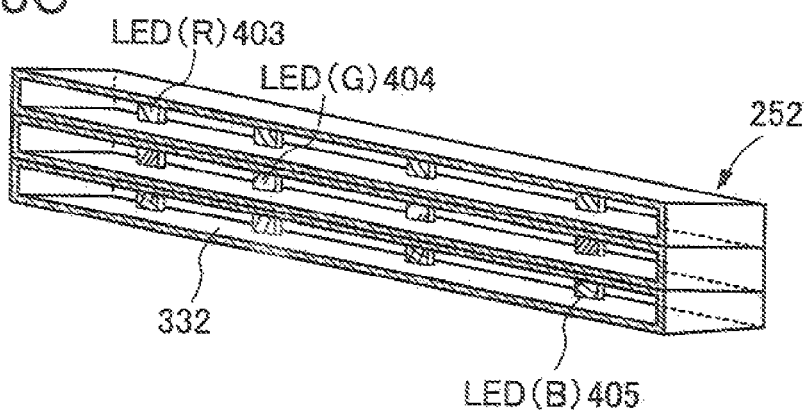

As shown in FIG. 8C, diodes (LED) 403, 404, and 405 of RGB colors can be used as light sources of the backlight unit 252. By using the diodes (LED) 403, 404, and 405 of RGB colors, higher color reproducibility can be realized in comparison with the case where only the diode (W) 402 which emits white light is used. In addition, the lamp reflector 332 can be provided to reflect light from the diodes (LED) 403, 404, 405 of RGB colors efficiently.

Figure 8D:
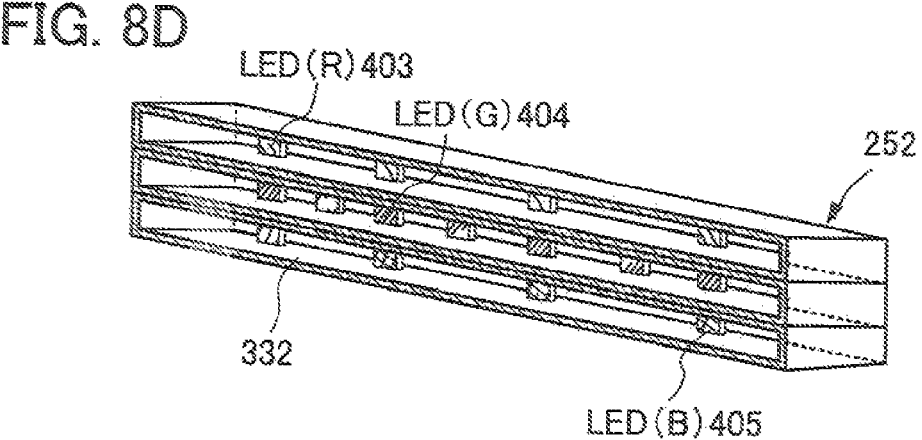

Further, as shown in FIG. 8D, in the case where the diodes (LED) 403, 404, and 405 of RGB colors are used as light sources, the number and arrangement thereof are not necessarily the same. For example, a plurality of diodes of a color having low emission intensity (for example, green) may be arranged.

Further, the diode 402 which emits white light may be used in combination with the diodes (LED) 403, 404, and 405 of RGB colors.

Note that in the case of having the diodes of RGB colors, the diodes sequentially emit light in accordance with time by applying a field sequential mode, thereby color display can be performed.

Using a diode is suitable for a large display device since luminance is high. Further, purity of RGB colors is high; therefore, a diode has excellent color reproducibility as compared to a cold cathode tube. In addition, an area required for arrangement can be reduced; therefore, a narrower frame can be achieved when a diode is applied to a small display device.

Further, a light source is not necessarily provided as the backlight unit shown in FIGS. 8A to 8D. For example, in the case where a backlight having a diode is mounted on a large display device, the diode can be arranged on a back side of the substrate. In this case, the diodes of RGB colors can be sequentially arranged at predetermined intervals. Depending on arrangement of the diodes, color reproducibility can be enhanced.

Stacked polarizing plates each having an extinction coefficient of an absorption axis which is different from that of an absorption axis of another polarizing plate are provided in such a display device using a backlight, whereby an image with a high contrast ratio can be produced. In particular, a backlight having a diode is suitable for a large display device. By enhancing a contrast ratio of a large display device, high-quality image can be produced even in a dark place.

Embodiment Mode 9

Driving methods of a liquid crystal of a liquid crystal display device include a vertical electrical field method where a voltage is applied perpendicularly to a substrate and a horizontal electrical field method where a voltage is applied in parallel to a substrate. The structure of the invention, in which a plurality of polarizing plates are provided, can be applied to either the vertical electrical field method or the horizontal electrical field method. In this embodiment mode, description is made of modes where stacked polarizing plates of the invention each having an extinction coefficient of an absorption axis which is different from that of an absorption axis of another polarizing plate are applied to various kinds of liquid crystal modes.

First, FIGS. 9A and 9B are pattern diagrams each showing a liquid crystal display device of a TN mode.

Similarly to FIGS. 3A and 3B, the layer 100 having a liquid crystal element is sandwiched between the first substrate 101 and the second substrate 102 which are provided so as to face each other. Then, the first polarizing plate 103 and the second polarizing plate 104 are provided on the first substrate 101 side, while the third polarizing plate 105 and the fourth polarizing plate 106 are provided on the second substrate 102 side. The first polarizing plate 103 and the second polarizing plate 104 are arranged so as to be in a parallel nicol state. The third polarizing plate 105 and the fourth polarizing plate 106 are arranged so as to be in a parallel nicol state, as well. The first polarizing plate 103 and the third polarizing plate 105 are arranged so as to be in a cross nicol state. Here, an extinction coefficient of an absorption axis of the first polarizing plate 103 and that of an absorption axis of the second polarizing plate 104 are different. Further, an extinction coefficient of an absorption axis of the third polarizing plate 105 and that of an absorption axis of the fourth polarizing plate 106 are different. A first electrode 115 and a second electrode 116 are provided over the first substrate 101 and the second substrate 102, respectively. In addition, an electrode on the side opposite to the backlight, that is, on a display surface side, such as the second electrode 116 is formed so as to have at least a light transmitting property.

In the case where a liquid crystal display device having such a structure is in a normally white mode, when a voltage is applied to the first electrode 115 and the second electrode 116 (referred to as a vertical electrical field method), black display is performed as shown in FIG. 9A. At that time, liquid crystal molecules are aligned vertically. Thus, light from the backlight cannot pass through the substrate, which leads to black display.

As shown in FIG. 9B, when a voltage is not applied between the first electrode 115 and the second electrode 116, white display is performed. At that time, liquid crystal molecules are aligned horizontally while twisted on a plane surface. As a result, light from the backlight can pass through the substrate provided with stacked polarizing plates each having an extinction coefficient of an absorption axis which is different from that of an absorption axis of another polarizing plate, whereby a predetermined image is displayed. By providing a color filter at that time, full-color display can be performed. The color filter can be provided on either the first substrate 101 side or the second substrate 102 side.

A known liquid crystal material may be used for a TN mode.

FIGS. 10A and 10B are pattern diagrams each showing a liquid crystal display device of a VA mode. A VA mode is a mode where liquid crystal molecules are aligned perpendicularly to a substrate when there is no electrical field.

Similarly to FIGS. 9A and 9B, the first electrode 115 and the second electrode 116 are provided over the first substrate 101 and the second substrate 102, respectively. In addition, an electrode on the side opposite to the backlight, that is on the display surface side, such as the second electrode 116 is formed so as to have at least light transmitting property. The first polarizing plate 103 and the second polarizing plate 104 are arranged so as to be in a parallel nicol state. The third polarizing plate 105 and the fourth polarizing plate 106 are arranged so as to be in a parallel nicol state, as well. The first polarizing plate 103 and the third polarizing plate 105 are arranged so as to be in a cross nicol state. Here, an extinction coefficient of an absorption axis of the first polarizing plate 103 and that of an absorption axis of the second polarizing plate 104 are different. Further, an extinction coefficient of an absorption axis of the third polarizing plate 105 and that of an absorption axis of the fourth polarizing plate 106 are different.

When a voltage is applied to the first electrode 115 and the second electrode 116 (vertical electrical field method) in a liquid crystal display device having such a structure, white display is performed, which means an on state, as shown in FIG. 10A. At that time, liquid crystal molecules are aligned horizontally. Thus, light from the backlight can pass through the substrate provided with the stacked polarizing plates each having an extinction coefficient of an absorption axis which is different from that of an absorption axis of another polarizing plate, whereby a predetermined image is displayed. By providing a color filter at that time, full-color display can be performed. The color filter can be provided on either the first substrate 101 side or the second substrate 102 side.

As shown in FIG. 10B, when a voltage is not applied to the first electrode 115 and the second electrode 116, black display is performed, which means an off state. At that time, liquid crystal molecules are aligned vertically. Thus, light from the backlight cannot pass through the substrate, which leads to black display.

Thus, in an off state, liquid crystal molecules are perpendicular to a substrate, thereby black display is performed. Meanwhile, in an on state, liquid crystal molecules are parallel to a substrate, thereby white display is performed. In an off state, liquid crystal molecules rise; therefore, polarized light from the backlight passes through a cell without being affected by the liquid crystal molecules, and can be completely blocked by a polarizing plate on a counter substrate side. Accordingly, further enhancement of contrast is anticipated by providing stacked polarizing plates each having an extinction coefficient of an absorption axis which is different from that of an absorption axis of another polarizing plate. The stacked polarizing plates of the invention can be applied to an MVA mode where liquid crystals are aligned symmetrically.

A known liquid crystal material may be used for a VA mode or an MVA mode.

FIGS. 11A and 11B are pattern diagrams each showing a liquid crystal display device of an OCB mode. In the OCB mode, alignment of liquid crystal molecules forms a compensation state optically in a liquid crystal layer, which is referred to as a bend orientation.

Similarly to FIGS. 9A and 9B, the first electrode 115 and the second electrode 116 are provided over the first substrate 101 and the second substrate 102 respectively. In addition, an electrode on the side opposite to the backlight, that is on the side of a display surface, such as the second electrode 116 is formed so as to have at least light transmitting property. The first polarizing plate 103 and the second polarizing plate 104 are arranged so as to be in a parallel nicol state. The third polarizing plate 105 and the fourth polarizing plate 106 are arranged so as to be in a parallel nicol state, as well. The first polarizing plate 103 and the third polarizing plate 105 are arranged so as to be in a cross nicol state. Here, an extinction coefficient of an absorption axis of the first polarizing plate 103 and that of an absorption axis of the second polarizing plate 104 are different. Further, an extinction coefficient of an absorption axis of the third polarizing plate 105 and that of an absorption axis of the fourth polarizing plate 106 are different.

When a voltage is applied to the first electrode 115 and the second electrode 116 (vertical electrical field method) in a liquid crystal display device having such a structure, black display is performed as shown in FIG. 11A. At that time, liquid crystal molecules are aligned vertically. Thus, light from the backlight cannot pass through the substrate, which leads to black display.

When a voltage is not applied between the first electrode 115 and the second electrode 116, white display is performed as shown in FIG. 11B. At that time, liquid crystal molecules are aligned in an arching line. Thus, light from the backlight can pass through the substrate provided with stacked polarizing plates each having an extinction coefficient of an absorption axis which is different from that of an absorption axis of another polarizing plate, whereby a predetermined image is displayed. By providing a color filter at that time, full-color display can be performed. The color filter can be provided on either the first substrate 101 side or the second substrate 102 side.

In such an OCB mode, birefringence in a liquid crystal layer caused in another mode is compensated only in the liquid crystal layer, whereby a wider viewing angle can be realized. Further, a contrast ratio can be enhanced by the stacked polarizing plates of the invention each having an extinction coefficient of an absorption axis which is different from that of an absorption axis of another polarizing plate.

Figure 12A:
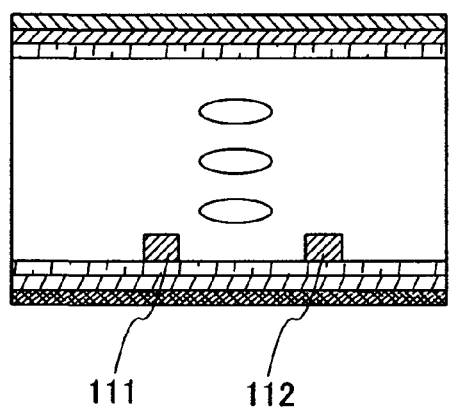
FIGS. 12A and 12B are cross sectional views each showing a liquid crystal mode of the invention.
Figure 12B:
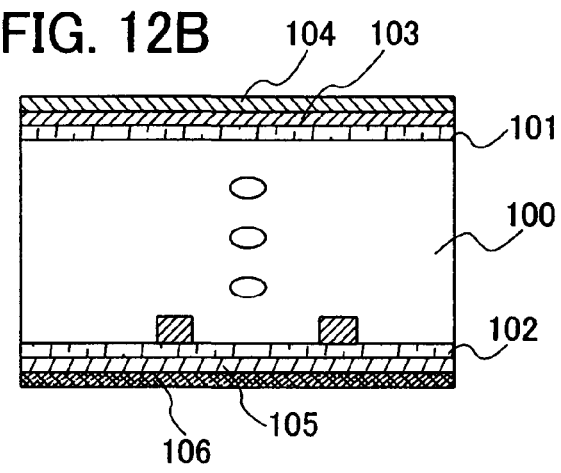

FIGS. 12A and 12B are pattern diagrams each showing a liquid crystal display device of an IPS mode. In the IPS mode, liquid crystal molecules are rotated constantly on a plane surface with respect to a substrate, and a horizontal electrical field method where electrodes are provided only on one substrate side is employed.

In the IPS mode, a liquid crystal is controlled by a pair of electrodes provided over one of the substrates. Therefore, a pair of electrodes 111 and 112 are provided over the second substrate 102. The pair of electrodes 111 and 112 preferably have light transmitting property. The first polarizing plate 103 and the second polarizing plate 104 are arranged so as to be in a parallel nicol state. The third polarizing plate 105 and the fourth polarizing plate 106 are arranged so as to be in a parallel nicol state, as well. The first polarizing plate 103 and the third polarizing plate 105 are arranged so as to be in a cross nicol state. Here, an extinction coefficient of an absorption axis of the first polarizing plate 103 and that of an absorption axis of the second polarizing plate 104 are different. Further, an extinction coefficient of an absorption axis of the third polarizing plate 105 and that of an absorption axis of the fourth polarizing plate 106 are different.

When a voltage is applied to the pair of electrodes 111 and 112 in a liquid crystal display device having such a structure, white display is performed, which means an on state, as shown in FIG. 12A. Then, light emitted from the backlight can pass through the substrate provided with stacked polarizing plates each having an extinction coefficient of an absorption axis which is different from that of an absorption axis of another polarizing plate, whereby a predetermined image is displayed. By providing a color filter at that time, full-color display can be performed. The color filter can be provided on either the first substrate 101 side or the second substrate 102 side.

When a voltage is not applied between the pair of electrodes 111 and 112, black display is performed, which means an off state, as shown in FIG. 12B. At that time, liquid crystal molecules are aligned horizontally and rotated in a plane. Thus, light from the backlight cannot pass through the substrate, which leads to black display.

A known liquid crystal material may be used for the IPS mode.

In a case where stacked polarizing plates of the invention each having an extinction coefficient of an absorption axis which is different from that of an absorption axis of another polarizing plate are applied to a liquid crystal display device of the horizontal electrical field method, display with a wider viewing angle and a higher contrast ratio can be realized. The horizontal electrical field method is preferable for a portable display device.

FIGS. 13A and 13B are pattern diagrams each showing a liquid crystal display device of the FLC mode and the AFLC mode.

Similarly to FIGS. 9A and 9B, the first electrode 115 and the second electrode 116 are provided over the first substrate 101 and the second substrate 102, respectively. In addition, an electrode on the side opposite to the backlight, that is on the display surface side, such as the second electrode 116 is formed so as to have at least light transmitting property. The first polarizing plate 103 and the second polarizing plate 104 are arranged so as to be in a parallel nicol state. The third polarizing plate 105 and the fourth polarizing plate 106 are arranged so as to be in a parallel nicol state, as well. The first polarizing plate 103 and the third polarizing plate 105 are arranged so as to be in a cross nicol state. Here, an extinction coefficient of an absorption axis of the first polarizing plate 103 and that of an absorption axis of the second polarizing plate 104 are different. Further, an extinction coefficient of an absorption axis of the third polarizing plate 105 and that of an absorption axis of the fourth polarizing plate 106 are different.

When a voltage is applied to the first electrode 115 and the second electrode 116 (referred to as a vertical electrical field method) in a liquid crystal display device having such a structure, white display is performed as shown in FIG. 13A. At that time, liquid crystal molecules are aligned horizontally and rotated in a plane. Thus, light from the backlight can pass through the substrate provided with the stacked polarizing plates each having an extinction coefficient of an absorption axis which is different from that of an absorption axis of another polarizing plate, whereby a predetermined image is displayed. By providing a color filter at that time, full-color display can be performed. The color filter can be provided on either the first substrate 101 side or the second substrate 102 side.

As shown in FIG. 13B, when a voltage is not applied to the first electrode 115 and the second electrode 116, black display is performed. At that time, liquid crystal molecules are aligned horizontally. Thus, light from the backlight cannot pass through the substrate, which leads to black display.

A known liquid crystal material may be used for the FLC mode and the AFLC mode.

Also, the invention can be applied to a liquid crystal display device of a rotation mode, a scattering mode, or a birefringence mode, and a display device in which a polarizing plate is provided on a side and another side of a substrate.

Embodiment Mode 10

The structure of the invention can be applied to a display device having a self-light emitting element, that is, a light emitting device. A pixel circuit included in such a light emitting device is described.

Figure 14A:
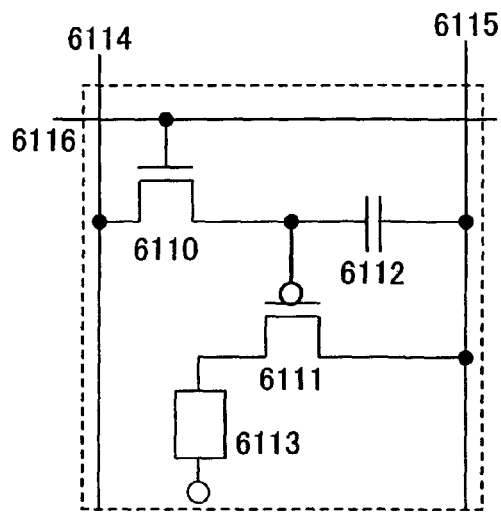
FIGS. 14A to 14C are diagrams each showing a pixel circuit included in a light emitting device of the invention.

FIG. 14A shows an example of an equivalent circuit diagram of a pixel, which includes a signal line 6114, a power source line 6115, and a scan line 6116, and in an intersecting region thereof, a light emitting element 6113, transistors 6110 and 6111, and a capacitor 6112 are provided. An image signal (also referred to as a video signal) is inputted to the signal line 6114 by a signal line driver circuit. The transistor 6110 can control to supply a potential of the image signal to a gate of the transistor 6111 in accordance with a selection signal inputted to the scan line 6116. The transistor 6111 can control to supply a current to the light emitting element 6113 in accordance with a potential of the image signal. The capacitor 6112 can hold a voltage between a gate and a source of the transistor 6111 (referred to as a gate-source voltage). Note that the capacitor 6112 is shown in FIG. 14A; however, the capacitor 6112 is not necessarily provided when substituted by gate capacitance or other parasitic capacitance of the transistor 6111.

Figure 14B:
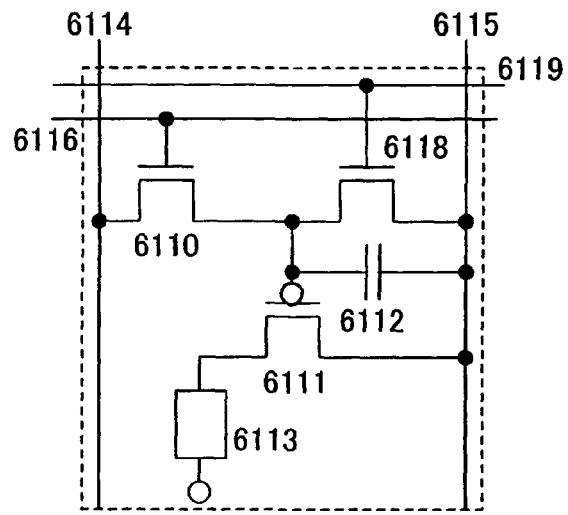

FIG. 14B is an equivalent circuit diagram of the pixel shown in FIG. 14A in which a transistor 6118 and a scan line 6119 are additionally provided. By the transistor 6118, the gate and the source of the transistor 6111 can have the same potential, which can forcibly lead to a state where a current does not flow to the light emitting element 6113. Therefore, the length of a subframe period can be shorter than a period in which the image signal is inputted to all pixels.

Figure 14C:
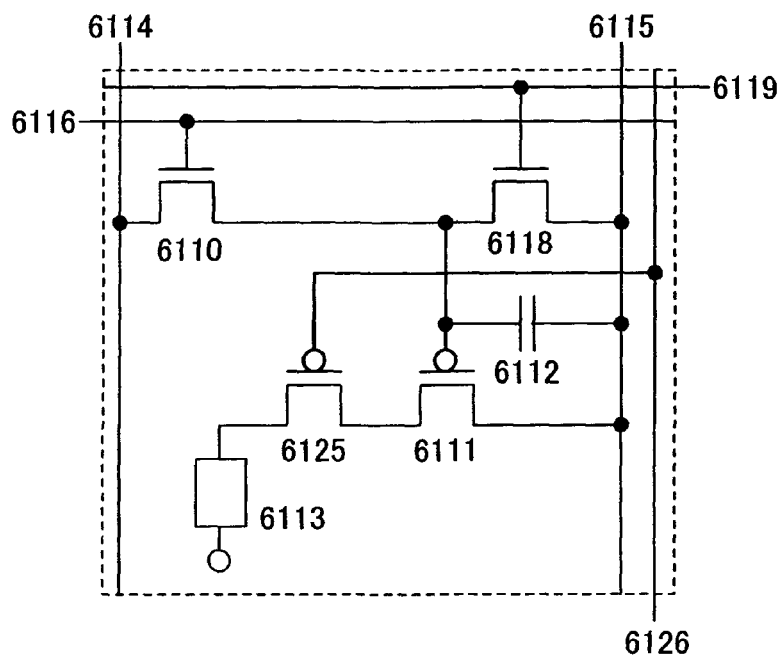

FIG. 14C is an equivalent circuit diagram of the pixel shown in FIG. 14B in which a transistor 6125 and a wiring 6126 are additionally provided. A gate potential of the transistor 6125 is fixed by the wiring 6126. The transistors 6111 and 6125 are connected in series between the power source line 6115 and the light emitting element 6113. Thus, in FIG. 14C, the transistor 6125 controls a current value supplied to the light emitting element 6113, and the transistor 6111 can control to supply the current to the light emitting element 6113 or not.

Note that a pixel circuit included in the display device of the invention is not limited to have a structure described in this embodiment mode. For example, a pixel circuit which includes a current mirror and performs analog gray scale display may be employed.

This embodiment mode can be freely combined with any of the aforementioned embodiment modes.

Embodiment Mode 11

An electronic appliance relating to the invention includes: a television set (simply referred to as a TV or a television receiver), a camera such as a digital camera and a digital video camera, a mobile phone set (simply referred to as a mobile phone set or a mobile phone), a portable information terminal such as a PDA, a portable game machine, a monitor for a computer, a computer, an audio reproducing device such as a car audio set, an image reproducing device provided with a recording medium such as a home game machine, and the like. Specific examples thereof are described with reference to FIGS. 15A to 15F.

Figure 15A:
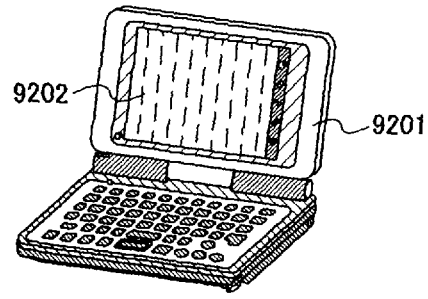
FIGS. 15A to 15F are views each showing an electronic appliannce of the invention.

A portable information terminal shown in FIG. 15A includes a main body 9201, a display portion 9202, and the like. The display device of the invention can be applied to the display portion 9202. Accordingly, a portable information terminal with a high contrast ratio can be provided.

Figure 15B:
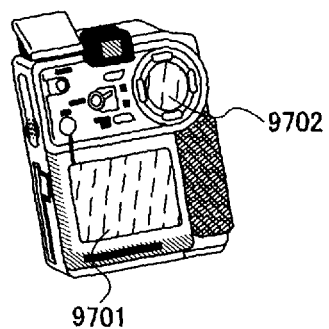

A digital video camera shown in FIG. 15B includes a display portion 9701, a display portion 9702, and the like. The display device of the invention can be applied to the display portion 9701. Accordingly, a digital video camera with a high contrast ratio can be provided.

Figure 15C:
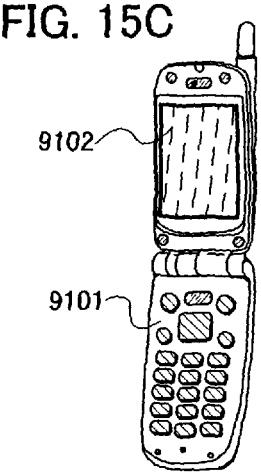

A mobile phone shown in FIG. 15C includes a main body 9101, a display portion 9102, and the like. The display device of the invention can be applied to the display portion 9102. Accordingly, a mobile phone with a high contrast ratio can be provided.

Figure 15D:
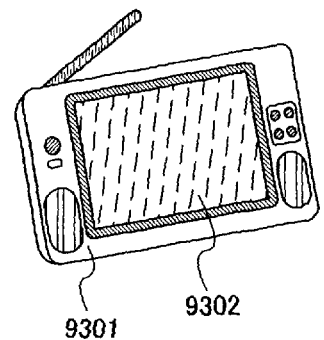

A portable television set shown in FIG. 15D includes a main body 9301, a display portion 9302, and the like. The display device of the invention can be applied to the display portion 9302. Accordingly, a portable television set with a high contrast ratio can be provided. The display device of the invention can be applied to various types of television sets such as a small-sized television incorporated in a portable terminal such as a mobile phone, a medium-sized television which is portable, and a large-sized television (for example, 40 inches in size or larger).

Figure 15E:
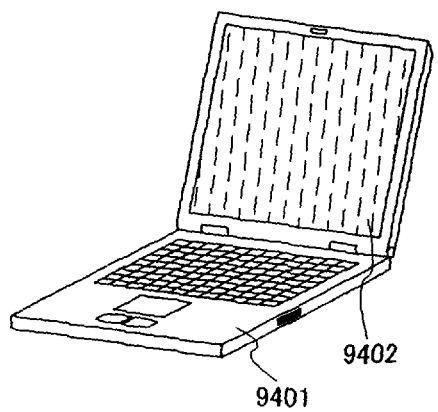

A portable computer shown in FIG. 15E includes a main body 9401, a display portion 9402 and the like. The display device of the invention can be applied to the display portion 9402. Accordingly, a portable computer with a high contrast ratio can be provided.

Figure 15F:
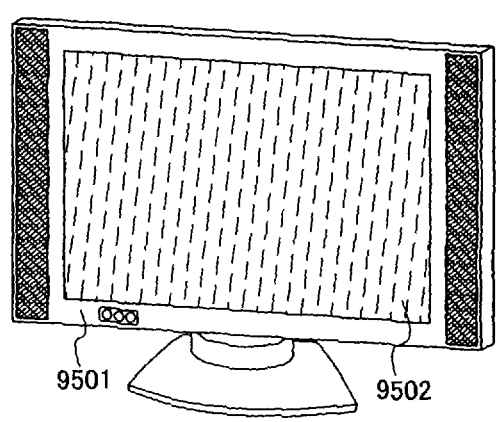

A television set shown in FIG. 15F includes a main body 9501, a display portion 9502, and the like. The display device of the invention can be applied to the display portion 9502. Accordingly, a television set with a high contrast ratio can be provided.

By thus using the display device of the invention, an electronic appliance with a high contrast ratio can be provided.

Embodiment 1

In this embodiment, description is made of a result of an optical culculation in the case where polarizing plates each having an extinction coefficient of an absorption axis which is different from that of an absorption axis of another polarizing plate are stacked. Further, as a comparison, an optical calculation in a case of using a pair of one kind of polarizing plates and an optical calculation in a case of using a pair of one kind of doubly-stacked polarizing plates are performed. Note that a contrast ratio is a ratio of white transmittance to black transmittance (white transmittance/black transmittance), and black transmittance and white transmittance are figured out, from which a contrast ratio can be calculated.

For a calculation in this embodiment, the optical calculation simulator for liquid crystal LCD MASTER (manufactured by SHINTECH, Inc.) is used. An optical calculation of transmittance with respect to a wavelength is performed by the LCD MASTER with an optical calculation algorithm of 2×2 matrix, which is not in view of multiple interference between elements, and an optical source wavelength of an 10 nm interval between 380 nm and 780 nm.

Figure 16:
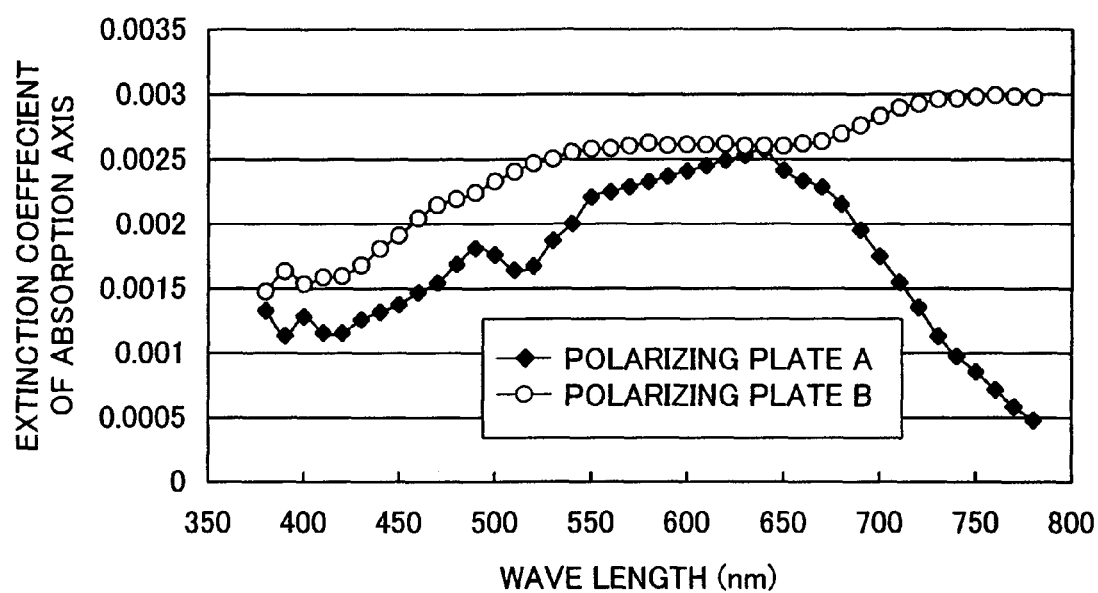
FIG. 16 is a diagram showing an extinction coefficient of a polarizing plate of Embodiment 1.

As a polarizing plate, a polarizing plate A (EG1425DU manufactured by Nitto Denko Corporation) and a polarizing plate B (SHC-PGW301 manufactured by Nitto Denko Corporation) of which data thereof is memorized in the LCD MASTER are used. FIG. 16 shows wavelength dependence of an extinction coefficient of an absorption axis of each polarizing plate. According to FIG. 16, it can be seen that each polarizing plate has a different extinction coefficient. Further, a thickness of each of the polarizing plates is 180 µm. For a backlight, the D65 light source is used, and a polarizing state is set to mixed circularly polarization.

Table 1 shows an optical system of cross nicol transmittance. As for an arrangement of absorption axes of polarizing plates, absorption axes of polarizing plates facing each other are arranged so as to be in a cross nicol state, and polarizing plates to be stacked are arranged so as to be in a parallel nicol state. In a thus arranged optical system, a calculation of transmittance of light from a backlight, which passes through a viewing side opposite to the backlight, is performed. A structure 1 where a pair of the polarizing plates A are arranged so as to be in a cross nicol state; a structure 2 where a pair of the doubly-stacked polarizing plates A are arranged so as to be in a cross nicol state; and a structure 3 where a pair of stacks of the polarizing plate A and the polarizing plates B are arranged so as to be in a cross nicol state are calculated.

TABLE 1

| Angle of absorption axis of polarizing plate (degree) | Structure 1 (polarizing plate 1 × 1) | Structure 2 (polarizing plate 2 × 2) | Structure 3 (polarizing plate A, polarizing plate B 2 × 2) |
|---|---|---|---|
| 90 | | viewing side polarizing plate A | polarizing plate A |
| 90 | polarizing plate A | polarizing plate A | polarizing plate B |
| 0 | polarizing plate A | polarizing plate A | polarizing plate B |
| 0 | | polarizing plate A backlight | polarizing plate A |

Table 2 shows an optical system of parallel nicol transmittance. As for an arrangement of absorption axes of polarizing plates, absorption axes of polarizing plates facing each other are arranged so as to be in a parallel nicol state, and polarizing plates to be stacked are arranged so as to be in a parallel nicol state. In a thus arranged optical system, a calculation of transmittance of light from a backlight, which passes through a viewing side opposite to the backlight, is performed. A structure 4 where a pair of the polarizing plates A are arranged so as to be in a parallel nicol state; a structure 5 where a pair of the doubly-stacked polarizing plates A are arranged so as to be in a parallel nicol state; and a structure 6 where a pair of stacks of the polarizing plate A and the polarizing plates B are arranged so as to be in a parallel nicol state are calculated.

TABLE 2

| Angle of absorption axis of polarizing plate (degree) | Structure 4 (polarizing plate 1 × 1) | Structure 5 (polarizing plate 2 × 2) | Structure 6 (polarizing plate A, polarizing plate B 2 × 2) |
|---|---|---|---|
| 90 | | viewing side polarizing plate A | polarizing plate A |
| 90 | polarizing plate A | polarizing plate A | polarizing plate B |
| 0 | polarizing plate A | polarizing plate A | polarizing plate B |
| 0 | | polarizing plate A backlight | polarizing plate A |

Furthermore, a ratio of parallel nicol transmittance shown in Table 2 to cross nicol transmittance shown in Table 1 (parallel nicol transmittance/cross nicol transmittance) is calculated. Here, in the case of using these polarizing plates for a liquid crystal display device, a liquid crystal layer is provided between polarizing plates shown in Table 1 of which absorption axes thereof make 90 degrees. The liquid crystal layer turns a polarizing direction of light entering from a backlight side by 90 degrees or not. Therefore, a ratio of parallel nicol transmittance to cross nicol transmittance correlates to a ratio of a state where white display is performed to a state where black display is performed in a display device. For this reason, it is also possible to evaluate a ratio of parallel nicol transmittance to cross nicol transmittance as a contrast ratio.

Thus, a contrast ratio in the case of using a pair of the polarizing plates A is a ratio of transmittance of the structure 4 to transmittance of the structure 1. A contrast ratio in the case of using a pair of the doubly-stacked polarizing plates A is a ratio of transmittance of the structure 5 to transmittance of the structure 2. A contrast ratio in the case of using a pair of stacks of the polarizing plate A and the polarizing plates B is a ratio of transmittance of the structure 6 to transmittance of the structure 3.

Figure 17:
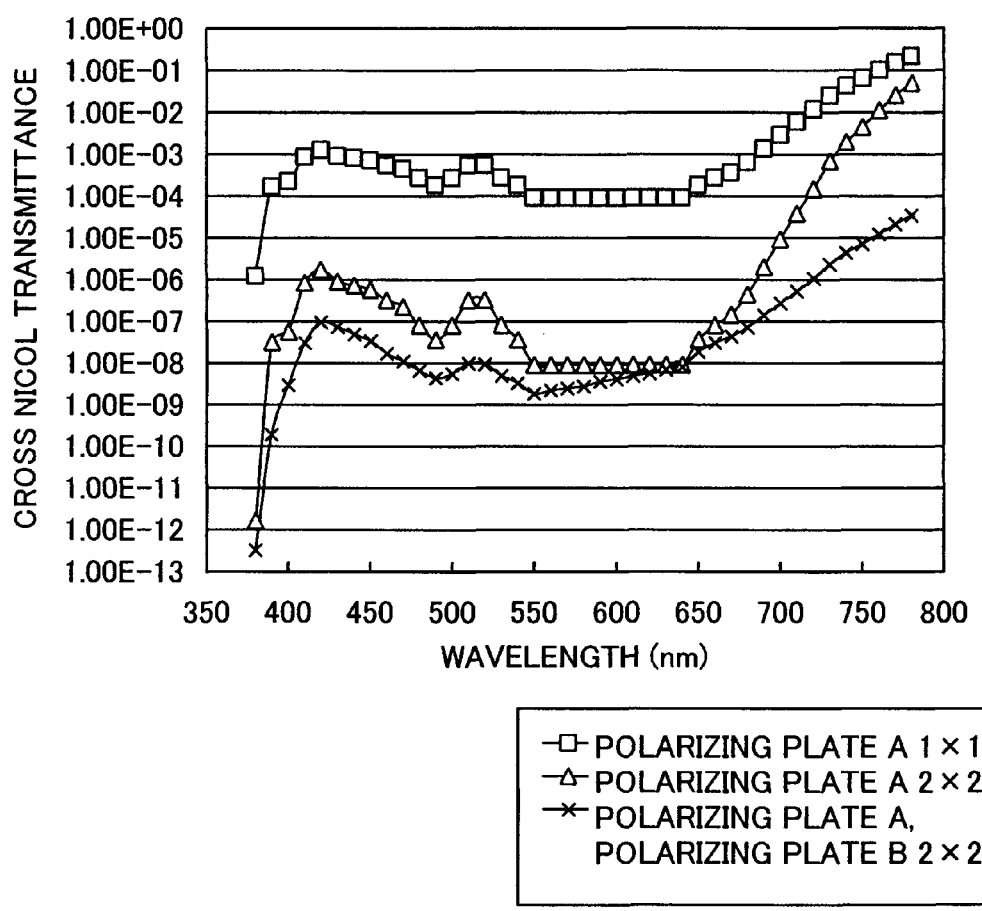
FIG. 17 is a diagram showing a culculation result of Embodiment 1.

FIG. 17 shows a calculation result of cross nicol transmittance. According to this, transmittance in the case of using a pair of the doubly-stacked polarizing plates A (the polarizing plates A 2×2) is lower than that in the case of using a pair of the polarizing plates A (the polarizing plate A 1×1) in the whole wavelength region between 380 nm and 780 nm. Further, transmittance in the case of using a pair of the doubly-stacked polarizing plates A (the polarizing plates A 2×2) is lower than that in the case of using a pair of stacks of the polarizing plate A and the polarizing plates B (the polarizing plate A and the polarizing plate B 2×2) in the whole wavelength region. This is because the polarizing plate B has a larger extinction coefficient of an absorption axis than the polarizing plate A, which means that light leakage can be reduced by stacking polarizing plates each having an extinction coefficient of an absorption axis which is different from that of an absorption axis of another polarizing plate.

Figure 18:
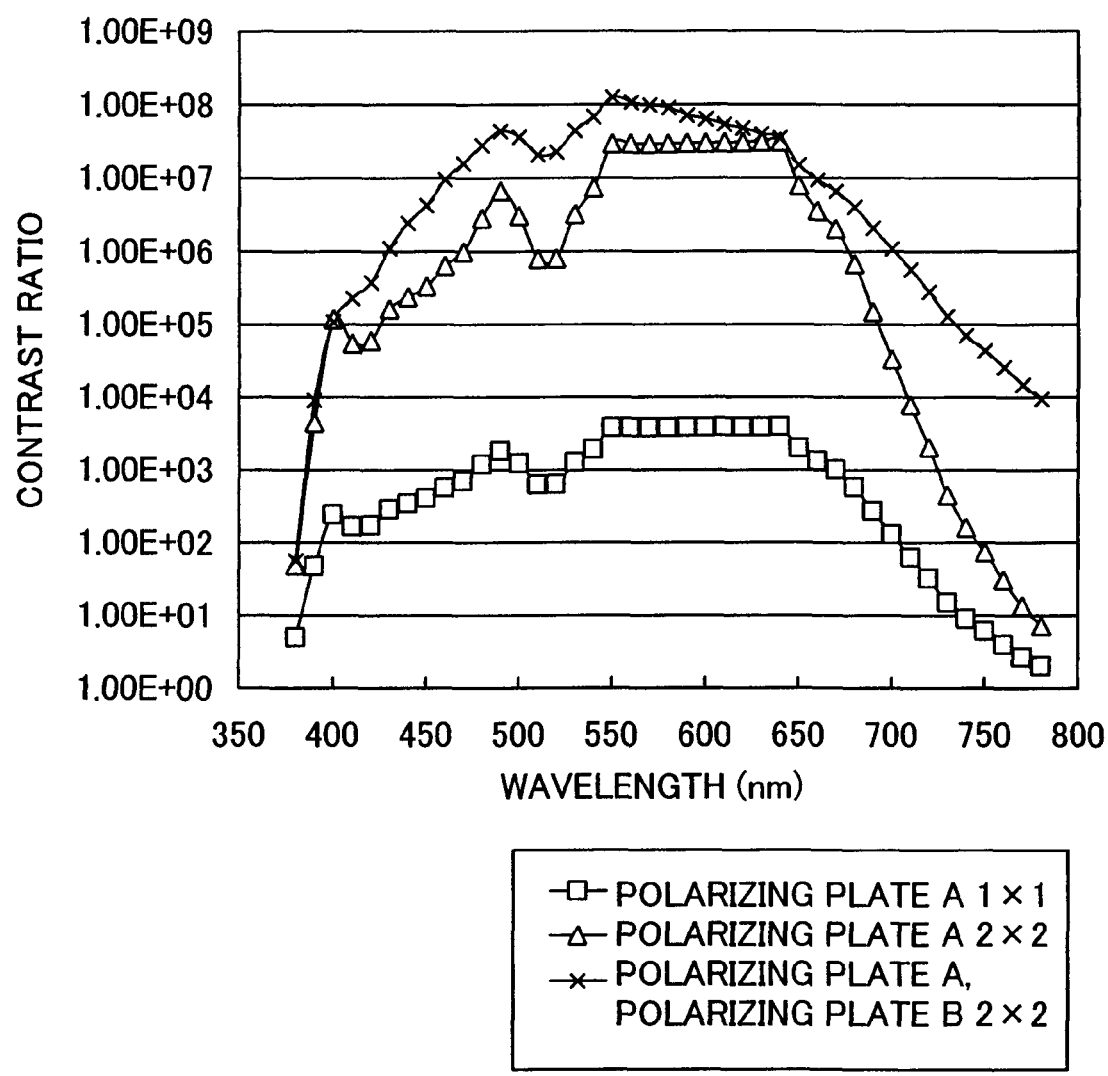
FIG. 18 is a diagram showing a culculation result of Embodiment 1.

FIG. 18 shows a calculation result of a contrast ratio. According to this, a contrast ratio in the case of the polarizing plates A 2×2 is higher than that in the case of the polarizing plate A 1×1 in the whole wavelength region between 380 nm and 780 nm. Further, a contrast ratio in the case of the polarizing plates A 2×2 is higher than that in the case of the polarizing plate A and the polarizing plate B 2×2 in the whole wavelength region. This is because cross nicol transmittance is lowered by stacking polarizing plates each having an extinction coefficient of an absorption axis which is different from that of an absorption axis of another polarizing plate.

Note that as for a pair of stacks of the polarizing plate A and the polarizing plates B of a cross nicol arrangement, combinations shown in Table 3 (structures 7, 8, and 9) are given other than the structure 3. Contrast ratios of the combinations are the same as those in the case of the polarizing plate A and the polarizing plate B 2×2 of FIG. 18; therefore, any of the combinations can enhance contrast.

TABLE 3

| Angle of absorption axis of polarizing plate (degree) | Structure 7 | Structure 8 | Structure 9 |
|---|---|---|---|
| | | viewing side | |
| 90 | polarizing plate A | polarizing plate B | polarizing plate B |
| 90 | polarizing plate B | polarizing plate A | polarizing plate A |
| 0 | polarizing plate A | polarizing plate B | polarizing plate A |
| 0 | polarizing plate B | polarizing plate A backlight | polarizing plate B |

As a result, by stacking polarizing plates each having a different extinction coefficient with respect to an absorption axis of each polarizing plate, light leakage can be reduced. Therefore, a contrast ratio can be enhanced.

This application is based on Japanese Patent Application serial no. 2005-380154 filed in Japan Patent Office on 28, Dec., 2005, the entire contents of which are hereby incorporated by reference.

What is claimed is:

1. A display device comprising:
  a display element sandwiched between a first light-transmissive substrate and a second light-transmissive substrate which are provided so as to face each other; and
  stacked polarizing plates outside the first light-transmissive substrate or the second light-transmissive substrate,
  wherein each of the stacked polarizing plates has an extinction coefficient of an absorption axis which is different from that of an absorption axis of another polarizing plate, and absorption axes of the stacked polarizing plates are in a parallel nicol state, and
  wherein each of the stacked polarizing plates includes iodine.

2. The display device according to claim 1, wherein the display element is a liquid crystal element.

3. The display device according to claim 1, wherein the display element is a light emitting element.

4. The display device according to claim 1, wherein the display device is an active matrix type display device.

5. The display device according to claim 1, wherein the display device is a passive matrix type display device.

6. A display device comprising:
  a display element sandwiched between a first light-transmissive substrate and a second light-transmissive substrate which are provided so as to face each other;
  a retardation film outside the first light-transmissive substrate or the second light-transmissive substrate; and
  stacked polarizing plates outside the retardation film,
  wherein each of the stacked polarizing plates has an extinction coefficient of an absorption axis which is different from that of an absorption axis of another polarizing plate, and absorption axes of the stacked polarizing plates are in a parallel nicol state, and
  wherein each of the stacked polarizing plates includes iodine.

7. The display device according to claim 6, wherein the display element is a liquid crystal element.

8. The display device according to claim 6, wherein the display element is a light emitting element.

9. The display device according to claim 6, wherein the display device is an active matrix type display device.

10. The display device according to claim 6, wherein the display device is a passive matrix type display device.

11. The display device according to claim 6, wherein the retardation film is a λ/4 plate.

12. A display device comprising:
  a display element sandwiched between a first light-transmissive substrate and a second light-transmissive substrate which are provided so as to face each other;
  first stacked polarizing plates outside the first light-transmissive substrate; and
  second stacked polarizing plates outside the second light-transmissive substrate,
  wherein each of the first stacked polarizing plates has an extinction coefficient of an absorption axis which is different from that of an absorption axis of another polarizing plate, and absorption axes of the first stacked polarizing plates are in a parallel nicol state,
  wherein each of the second stacked polarizing plates has an extinction coefficient of an absorption axis which is different from that of an absorption axis of another polarizing plate, and absorption axes of the second stacked polarizing plates are in a parallel nicol state, and
  wherein each of the first and second stacked polarizing plates includes iodine.

13. The display device according to claim 12, wherein the display element is a liquid crystal element.

14. The display device according to claim 12, wherein the display element is a light emitting element.

15. The display device according to claim 12, wherein the display device is an active matrix type display device.

16. The display device according to claim 12, wherein the display device is a passive matrix type display device.

17. The display device according to claim 12, wherein the absorption axes of the first stacked polarizing plates and those of the second stacked polarizing plates are in a cross nicol state.

18. A display device comprising:
  a display element sandwiched between a first light-transmissive substrate and a second light-transmissive substrate which are provided so as to face each other;
  a first retardation film outside the first light-transmissive substrate;
  a second retardation film outside the second light-transmissive substrate;
  first stacked polarizing plates outside the first retardation film; and
  second stacked polarizing plates outside the second retardation film,
  wherein each of the first stacked polarizing plates has an extinction coefficient of an absorption axis which is different from that of an absorption axis of another polarizing plate, and absorption axes of the first stacked polarizing plates are in a parallel nicol state, wherein each of the second stacked polarizing plates has an extinction coefficient of an absorption axis which is different from that of an absorption axis of another polarizing plate, and absorption axes of the second stacked polarizing plates are in a parallel nicol state, and wherein each of the first and second stacked polarizing plates includes iodine.

19. The display device according to claim 18, wherein the display element is a liquid crystal element.

20. The display device according to claim 18, wherein the display element is a light emitting element.

21. The display device according to claim 18, wherein the display device is an active matrix type display device.

22. The display device according to claim 18, wherein the display device is a passive matrix type display device.

23. The display device according to claim 18, wherein the retardation film is a $\lambda/4$ plate.

24. The display device according to claim 18, wherein the absorption axes of the first stacked polarizing plates and those of the second stacked polarizing plates are in a cross nicol state.

* * * * *